(12) United States Patent
Muratani et al.

(10) Patent No.: US 8,477,427 B2
(45) Date of Patent: Jul. 2, 2013

(54) ZOOM LENS SYSTEM, OPTICAL APPARATUS EQUIPPED WITH ZOOM LENS SYSTEM AND METHOD FOR ZOOMING ZOOM LENS SYSTEM

(75) Inventors: Mami Muratani, Tokyo (JP); Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/058,852

(22) PCT Filed: Aug. 5, 2009

(86) PCT No.: PCT/JP2009/064212
§ 371 (c)(1),
(2), (4) Date: Feb. 12, 2011

(87) PCT Pub. No.: WO2010/018839
PCT Pub. Date: Feb. 18, 2010

(65) Prior Publication Data
US 2011/0141575 A1    Jun. 16, 2011

(30) Foreign Application Priority Data
Aug. 13, 2008 (JP) .................. 2008-208351

(51) Int. Cl.
*G02B 15/14* (2006.01)
*G02B 27/64* (2006.01)

(52) U.S. Cl.
USPC ............ 359/680; 359/554; 359/557; 359/691

(58) Field of Classification Search
USPC .......................... 359/680–682, 691, 554, 557
See application file for complete search history.

(56) References Cited

U.S. PATENT DOCUMENTS

| | | | |
|---|---|---|---|
| 5,182,673 A | 1/1993 | Kikuchi et al. | |
| 5,539,581 A * | 7/1996 | Sato | 359/676 |
| 5,793,536 A | 8/1998 | Sato | |
| 5,844,724 A * | 12/1998 | Foo | 359/691 |
| 6,275,342 B1 | 8/2001 | Sakamoto et al. | |

(Continued)

FOREIGN PATENT DOCUMENTS

| | | |
|---|---|---|
| JP | 4-218013 A | 8/1992 |
| JP | 07-181377 A | 7/1995 |

(Continued)

OTHER PUBLICATIONS

English translation of International Preliminary Report on Patentability from International Patent Application No. PCT/JP2009/064212.

(Continued)

*Primary Examiner* — Scott J Sugarman
(74) *Attorney, Agent, or Firm* — Miles & Stockbridge P.C.

(57) ABSTRACT

A zoom lens system ZL mounted in an electronic still camera 1 etc is constructed to include, in order from an object side, a first lens group G1 having negative refractive power and a second lens group G2 having positive refractive power, in which the second lens group G2 has two cemented lenses. A distance between the first lens group G1 and the second lens group G2 changes when a lens position state changes from a wide-angle end state to a telephoto end state, thereby providing the zoom lens system exhibiting preferable optical performance, an optical apparatus including the zoom lens system and a magnification varying method using the zoom lens system.

32 Claims, 15 Drawing Sheets

U.S. PATENT DOCUMENTS

| | | |
|---|---|---|
| 7,215,483 B2 | 5/2007 | Sekita |
| 7,277,232 B2 | 10/2007 | Sato |
| 2004/0150890 A1 | 8/2004 | Sato |
| 2005/0041302 A1 | 2/2005 | Ozaki et al. |
| 2006/0007559 A1 | 1/2006 | Sato |
| 2006/0114574 A1 | 6/2006 | Sekita |
| 2008/0019021 A1 | 1/2008 | Kawakami et al. |
| 2009/0091845 A1 | 4/2009 | Katakura |
| 2010/0245629 A1 | 9/2010 | Nanba et al. |

FOREIGN PATENT DOCUMENTS

| | | |
|---|---|---|
| JP | 8-334694 A | 12/1996 |
| JP | 10-213744 A | 8/1998 |
| JP | 10-213744 A | 8/1998 |
| JP | 2000-002837 A | 1/2000 |
| JP | 2004-226850 A | 12/2004 |
| JP | 2005-99758 | 4/2005 |
| JP | 2006-084829 A | 3/2006 |
| JP | 2008-26750 A | 2/2008 |
| JP | 2009-86416 A | 4/2009 |
| JP | 2009-92836 A | 4/2009 |
| WO | WO 2009/044664 A1 | 4/2009 |

OTHER PUBLICATIONS

Office Action issued Jul. 13, 2012 in Chinese Patent Application No. 200980140112.4.

* cited by examiner

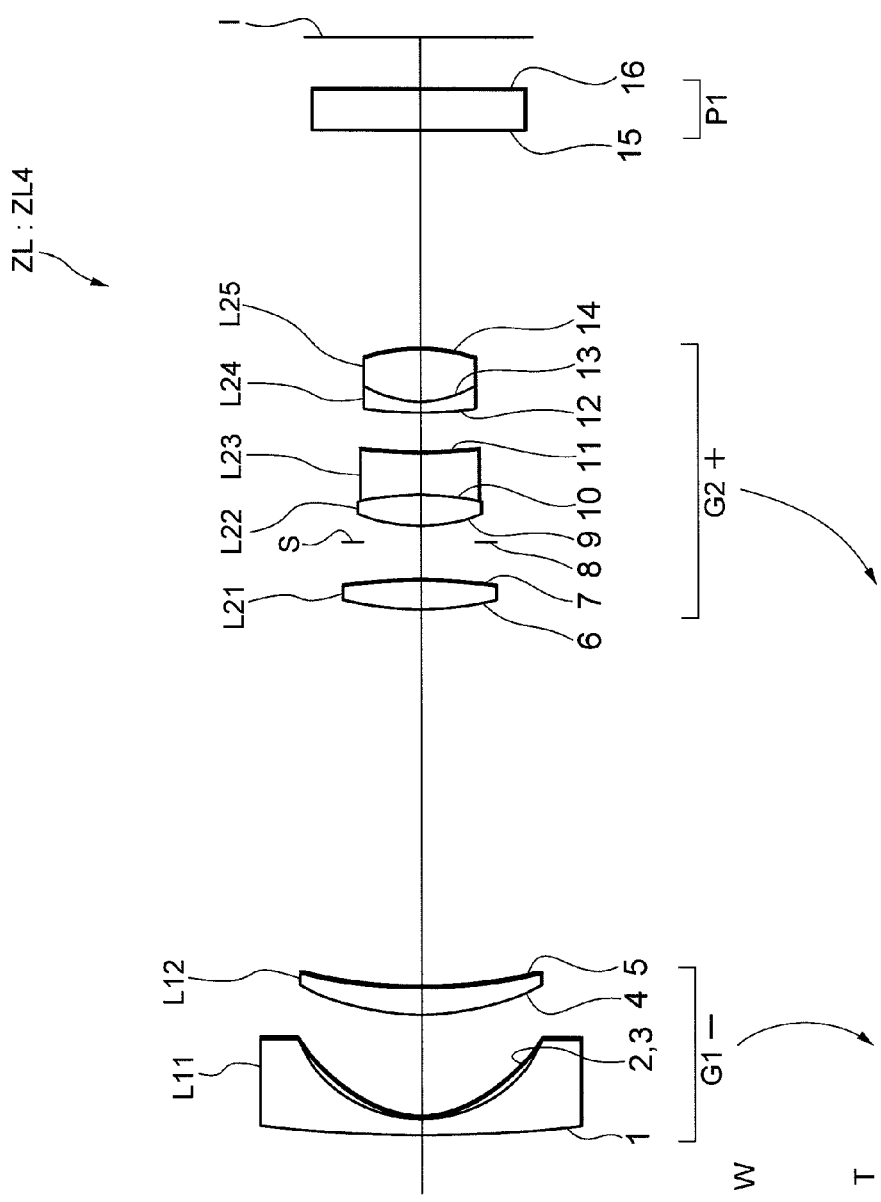

ZOOM LENS SYSTEM, OPTICAL APPARATUS EQUIPPED WITH ZOOM LENS SYSTEM AND METHOD FOR ZOOMING ZOOM LENS SYSTEM

TECHNICAL FIELD

The present invention relates to a zoom lens system, an optical apparatus equipped with the zoom lens system and a method for zooming the zoom lens system.

BACKGROUND ART

A zoom lens system of a negative-leading type suited to a solid-state imaging device has hitherto been proposed (refer to, e.g., Japanese Patent Application Laid-Open Publication No. H10-213744).

The conventional negative-leading type zoom lens system has a problem of having a difficulty of attaining both of downsizing and preferable correction of aberrations.

DISCLOSURE OF THE INVENTION

It is an object of the present invention, which was devised in view of the problem given above, to provide a downsized zoom lens system exhibiting a preferable optical performance.

To accomplish the object, according to a first aspect of the present invention, there is provided a zoom lens system comprising, in order from an object side: a first lens group having negative refractive power; and a second lens group having positive refractive power, wherein said second lens group has two cemented lenses, and a distance between said first lens group and said second lens group varies upon zooming from a wide-angle end state to a telephoto end state, and the following conditional expression (1) is satisfied:

$$0.1 < dn/ds < 0.5 \tag{1}$$

where ds denotes a thickness along an optical axis of two cemented lenses of the second lens group from a surface closest to the object to a surface closest to the image, and dn denotes a thickness along the optical axis of a negative lens composing the cemented lens disposed on the object side in the two cemented lenses.

In the first aspect of the present invention, it is preferable to satisfy the following conditional expression (2):

$$0.4 < dn/da < 1.0 \tag{2}$$

where da denotes a thickness along an optical axis of the cemented lens disposed on the object side in the two cemented lenses, and dn denotes a thickness along an optical axis of the negative lens composing the cemented lens.

In the first aspect of the present invention, it is preferable to satisfy the following conditional expression (3):

$$0.02 < dn/s2 < 0.50 \tag{3}$$

where dn denotes a thickness along an optical axis of the negative lens composing the cemented lens disposed on the object side in the two cemented lenses, and s2 denotes a combined thickness along an optical axis of the second lens group.

In the first aspect of the present invention, it is preferable to satisfy the following conditional expression (4):

$$0.05 < sp/dn < 1.00 \tag{4}$$

where dn denotes a thickness along an optical axis of the negative lens composing the cemented lens disposed on the object side in the two cemented lenses, and sp denotes a distance between the two cemented lenses.

In the first aspect of the present invention, it is preferable to satisfy the following conditional expression (5):

$$0.03 < sp/f2 < 0.20 \tag{5}$$

where sp denotes a distance between the two cemented lenses, and f2 denotes a focal length of the second lens group G2.

In the first aspect of the present invention, it is preferable to satisfy the following conditional expression (6):

$$0.05 < sp/dp < 0.20 \tag{6}$$

where dp denotes a thickness along an optical axis of the positive lens composing the cemented lens disposed on the image side in the two cemented lenses, and sp denotes a distance between the two cemented lenses.

In the first aspect of the present invention, it is preferable that an image side surface of said negative lens composing said cemented lens disposed on the object side in said two cemented lenses is a concave surface directed to the image side, and the following conditional expression (7) is satisfied:

$$0.01 < sp/Ra < 0.15 \tag{7}$$

where Ra denotes a radius of curvature of the image-sided surface of the negative lens, and sp denotes the distance between the two cemented lenses.

In the first aspect of the present invention, it is preferable that the image side surface of said negative lens composed of said cemented lens disposed on the object side in said two cemented lenses is a concave surface directed to the image side, and said zoom lens system satisfies the following conditional expression (8):

$$-1.1 \leq (Rb-Ra)/(Rb+Ra) < 7.0 \tag{8}$$

where Ra denotes a radius of curvature of the concave surface, and Rb denotes a radius of curvature of the object-sided surface of the lens disposed on the image side of the negative lens.

In the first aspect of the present invention, it is preferable that said first lens group includes, in order from the object side, one or two single lens(es) having negative refractive power and a single lens having positive refractive power.

In the first aspect of the present invention, it is preferable that said image side negative lens composing said cemented lens disposed on the object side in said cemented lenses disposed within said second lens group has a concave surface directed to the image side.

In the first aspect of the present invention, it is preferable to satisfy the following conditional expression (9):

$$1.77 < nd \tag{9}$$

where nd denotes a refractive index with respect to d-line of the image-sided negative lens composing the cemented lens disposed on the object side in the cemented lenses disposed within the second lens group.

In the first aspect of the present invention, it is preferable that said second lens group includes three lens components.

In the first aspect of the present invention, it is preferable that said second lens group includes, in order from the object side, a positive single lens, a cemented lens constructed by a positive lens cemented with a negative lens, and a cemented lens constructed by a positive lens cemented with a negative lens.

In the first aspect of the present invention, it is preferable that a surface closest to the image side of said cemented lens disposed on the image side in said two cemented lenses is formed with an aspherical shape.

In the first aspect of the present invention, it is preferable to satisfy the following conditional expression (10):

$$0.15 < ndn - ndp < 0.50 \qquad (10)$$

where ndp denotes an average of refractive indices of the positive lenses contained in the two cemented lenses, and ndn denotes an average of the refractive indices of the negative lenses contained in the two cemented lenses.

In the first aspect of the present invention, it is preferable to satisfy the following conditional expression (11):

$$20 < vdp - vdn < 55 \qquad (11)$$

where vdp denotes an average of Abbe numbers of the positive lenses contained in the two cemented lenses, and vdn denotes an average of Abbe numbers of the negative lenses contained in the two cemented lenses.

In the first aspect of the present invention, it is preferable that at least a portion of lens group of said second lens group moves in a direction including a component perpendicular to an optical axis.

In the first aspect of the present invention, it is preferable that at least one of said cemented lenses of said second lens group moves in a direction including a component perpendicular to an optical axis.

In the first aspect of the present invention, it is preferable that said second lens group includes two cemented lenses disposed consecutively in alignment, and the surface closest to the image side of said consecutive cemented lenses is a convex surface directed to the image side.

In the first aspect of the present invention, it is preferable that said second lens group includes at least two double convex lenses.

In the first aspect of the present invention, it is preferable that said positive lens composing said cemented lens disposed on the object side within said second lens group is a double convex lens.

In the first aspect of the present invention, it is preferable that any one of said cemented lenses included in said second lens group is a positive lens element.

According to a second aspect of the present invention, there is provided an optical apparatus including said zoom lens system according to the first aspect.

According to a third aspect of the present invention, there is provided a method for manufacturing a zoom lens system including, in order from an object side, a first lens group and a second lens group, said method comprising steps of: disposing said first lens group so as to have negative refractive power and said second lens group including two cemented lenses so as to have positive refractive power on the whole; and varying a distance between said first lens group and said second lens group upon zooming from a wide-angle end state to a telephoto end state with satisfying the following conditional expression (1):

$$0.1 < dn/ds < 0.5 \qquad (1)$$

where ds denotes a thickness along an optical axis of two cemented lenses of the second lens group from a surface closest to the object to a surface closest to the image, and dn denotes a thickness along the optical axis of a negative lens composing the cemented lens disposed on the object side in the two cemented lenses.

In the third aspect of the present invention, it is preferable to satisfy the following conditional expression (2):

$$0.4 < dn/da < 1.0 \qquad (2)$$

where da denotes a thickness along an optical axis of the cemented lens disposed on the object side in the two cemented lenses, and dn denotes a thickness along an optical axis of the negative lens composing the cemented lens.

In the third aspect of the present invention, it is preferable to satisfy the following conditional expression (3):

$$0.02 < dn/s2 < 0.50 \qquad (3)$$

where dn denotes a thickness along an optical axis of the negative lens composing the cemented lens disposed on the object side in the two cemented lenses, and s2 denotes a combined thickness along an optical axis of the second lens group.

It is feasible to attain downsizing and acquire preferable optical performance by configuring, in the way described above, the zoom lens system, the optical apparatus including the zoom lens system and the method of varying the magnification through the zoom lens system according to the present invention.

BRIEF DESCRIPTION OF THE DRAWINGS

FIGS. 2A, 2B and 2C are diagrams of various aberrations in an infinite-distance focusing state in Example 1, in which FIG. 2A is the diagrams of the various aberrations in a wide-angle end state, FIG. 2B is the diagrams of the various aberrations in an intermediate focal length state, and FIG. 2C is the diagram of the various aberrations in a telephoto end state.

FIGS. 4A, 4B and 4C are diagrams of various aberrations in an infinite-distance focusing state in Example 2, in which FIG. 4A is diagrams of various aberrations in the wide-angle end state, FIG. 4B is diagrams of various aberrations in the intermediate focal length state, and FIG. 4C is diagrams of various aberrations in the telephoto end state.

FIGS. 6A, 6B and 6C are diagrams of various aberrations in an infinite-distance focusing state in Example 3, in which FIG. 6A is diagrams of various aberrations in the wide-angle end state, FIG. 6B is diagrams of various aberrations in the intermediate focal length state, and FIG. 6C is diagrams of various aberrations in the telephoto end state.

FIG. 7 is a sectional view showing a configuration of a zoom lens system according to Example 4.

FIGS. 8A, 8B and 8C are diagrams of various aberrations in an infinite-distance focusing state in Example 4, in which FIG. 8A is diagrams of various aberrations in the wide-angle end state, FIG. 8B is diagrams of various aberrations in the intermediate focal length state, and FIG. 8C is diagrams of various aberrations in the telephoto end state.

FIGS. 10A, 10B and 10C are diagrams of various aberrations in an infinite-distance focusing state in Example 5, in which FIG. 10A is diagrams of various aberrations in the wide-angle end state, FIG. 10B is diagrams of various aberrations in the intermediate focal length state, and FIG. 10C is diagrams of various aberrations in the telephoto end state.

FIGS. 12A, 12B and 12C are diagrams of various aberrations in an infinite-distance focusing state in Example 6, in which FIG. 12A is diagrams of various aberrations in the wide-angle end state, FIG. 12B is diagrams of various aberrations in the intermediate focal length state, and FIG. 12C is diagrams of various aberrations in the telephoto end state.

FIGS. 13A and 13B illustrate an electronic still camera mounted with a zoom lens system according to the present invention, in which FIG. 13A is a front view; and FIG. 13B is a rear view.

EMBODIMENT FOR CARRYING OUT THE INVENTION

Figure 1:
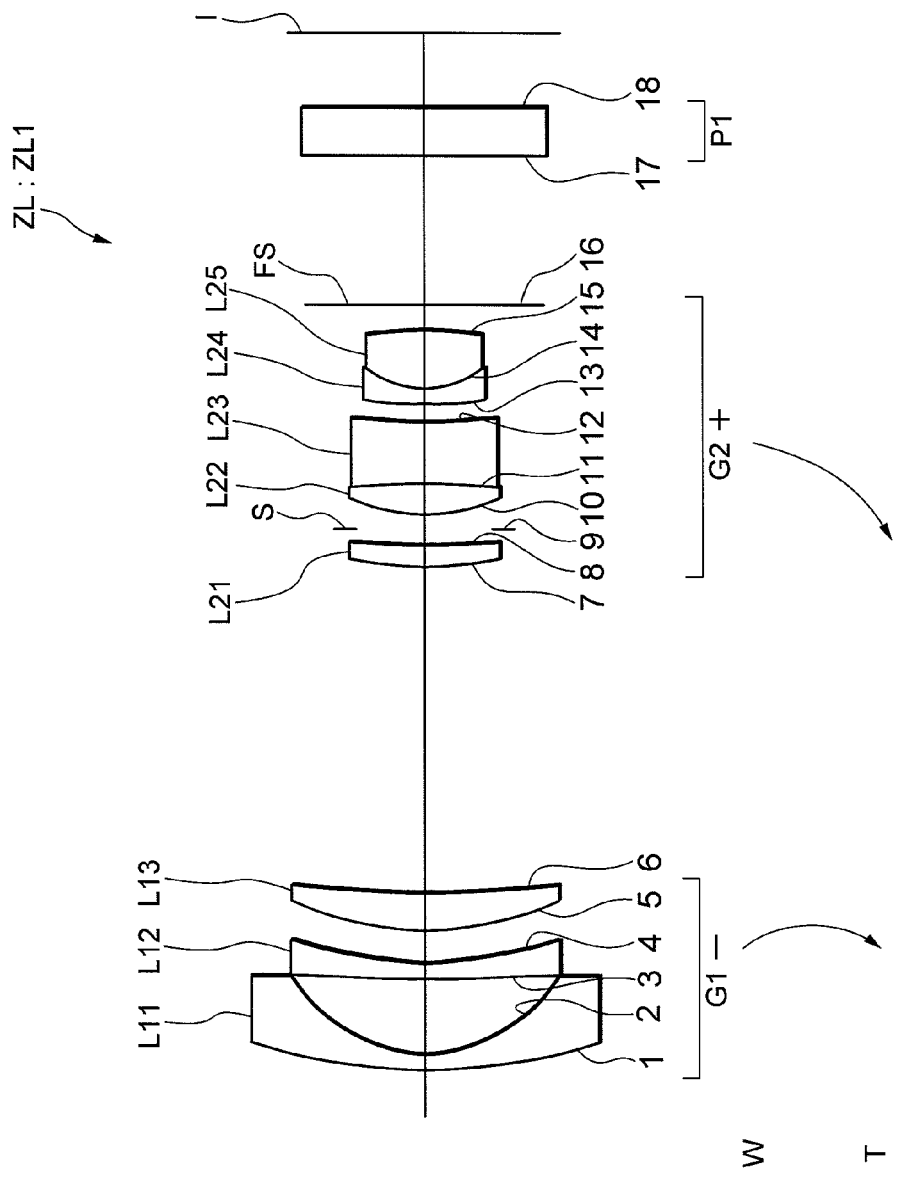
FIG. 1 is a sectional view showing a configuration of a zoom lens system according to Example 1.

A preferred embodiment according to the present invention will hereinafter be described with reference to the drawings. It should be noted that a wide-angle end state and a telephoto end state represent an infinite-distance focusing state unless particularly specified in the present specification. As shown in FIG. 1, a zoom lens system ZL is composed of, in order from an object side, a first lens group G1 having negative refractive power and a second lens group G2 having positive refractive power. Then, a configuration is that a distance between the first lens group G1 and the second lens group G2 changes upon a lens position state changes from the wide-angle end state to the telephoto end state.

Further, in the zoom lens system ZL according to the present embodiment, the second lens group G2 has a configuration of having at least two cemented lenses. The second lens group G2 receiving incident light from the first lens group G1 having negative refractive power corrects on-axis aberrations such as spherical aberration mainly by use of the object-sided surface and off-axis aberrations such as coma and curvature of field by use of the image-sided surface, and therefore requires a considerable thickness in terms of correcting the aberrations. At this time, such a solution exists that a distance from the object-sided surface to the image-sided surface within the second lens group G2 is obtained by enlarging a distance between the lenses in a way that decreases the thickness of the lens, however, conversely if the distance is shrunk by increasing the thickness of the lens, an overall length can be shortened because of an elongated length of an optical path length in terms of air conversion. Especially when increasing the thickness of the negative lens on the object side, all of the aberrations such as coma, astigmatism and curvature of field are well corrected, and, because of being capable of neatly correcting spherical aberration and distortion in particular, a reserved capacity for correcting aberrations of other surfaces can be left.

Therefore, it is desirable that a zoom lens system ZL according to the present embodiment satisfies the following conditional expression (1):

$$0.1 < dn/ds < 0.5 \tag{1}$$

where ds denotes a thickness along an optical axis of two cemented lenses of the second lens group G2 from a surface closest to the object to a surface closest to the image, and dn denotes a thickness along the optical axis of a negative lens composing the cemented lens disposed on the object side in the two cemented lenses.

Conditional expression (1) specifies a proper range of a relation between a total on-axis distance from the surface closest to the object to the surface closest to the image and the thickness along the optical axis of the negative lens of the cemented lens disposed on the object side in the two cemented lenses included within the second lens group G2. If numerical values in conditional expression (1) are increased, there is an advantage for reducing the overall length, however, when the value exceeds the upper limit of conditional expression (1), it follows that the overall length increases in turn due to an adverse effect this time. Further, the total thickness of the second lens group G2 rises, and hence there is nothing but to decrease the thickness of the first lens group G1 to that degree, with the result that chromatic aberration and distortion become hard to be corrected. Alternatively, the distance between the cemented lenses is reduced, and the cemented lenses interfere with each other, which is an undesirable aspect. Moreover, it is preferable for ensuring the effect of the embodiment that the upper limit of conditional expression (1) is set to 0.47. In addition, it is further preferable for ensuring the effect of the embodiment that the upper limit of conditional expression (1) is set to 0.45. When the value falls below the lower limit of conditional expression (1), the thickness of the image-sided negative lens decreases, and therefore, when in an attempt to keep the same power in a direction disadvantageous to the correction of the aberrations, the radius of curvature is reduced, with the result that the off-axis aberrations are hard to be corrected. Further, Petzval sum becomes excessively large, an image plane gets curved in a minus direction on the whole, which is an undesirable aspect. Moreover, it is also preferable for ensuring the effect of the embodiment that the lower limit of conditional expression (1) is set to 0.15. In addition, it is also preferable for further ensuring the effect of the embodiment that the lower limit of conditional expression (1) is set to 0.20.

Further, in the present zoom lens system ZL, it is desirable to satisfy the following conditional expression (2):

$$0.4 < dn/da < 1.0 \tag{2}$$

where da denotes a thickness along an optical axis of the cemented lens disposed on the object side in the two cemented lenses, and dn denotes a thickness along an optical axis of the negative lens composing the cemented lens.

Conditional expression (2) specifies the thickness along the optical axis of the negative lens composing the cemented lens elements disposed on the object side in the two cemented lenses and the thickness of the cemented lens elements. When the value exceeds the upper limit of conditional expression (2), the thickness of the positive lens cemented on the object side relatively decreases, and hence the radius of curvature is reduced, resulting in inability of ensuring a marginal thickness of the lens. Further, it is difficult to correct spherical aberration, and it is also difficult to take a balance of chromatic aberration over entire range from the wide-angle end state to the telephoto end state, which is an undesirable aspect. Moreover, it is preferable for ensuring the effect of the embodiment that the upper limit of conditional expression (2) is set to 0.9. Furthermore, it is also preferable for ensuring the effect of the embodiment that the upper limit of conditional expression (2) is set to 0.8. When the value falls below the lower limit of conditional expression (2), the thickness of the image-sided negative lens decreases, and therefore, when in an attempt to keep the same power, the radius of curvature is reduced, with the result that off-axis aberrations are hard to be corrected. Further, the Petzval sum becomes excessively large, the image plane gets curved in the minus direction on the whole, which is an undesirable aspect. Moreover, it is also preferable for ensuring the effect of the embodiment that the lower limit of conditional expression (2) is set to 0.45. In addition, it is also preferable for further ensuring the effect of the embodiment that the lower limit of conditional expression (2) is set to 0.5.

Further, in the present zoom lens system ZL, it is desirable to satisfy the following conditional expression (3):

$$0.02 < dn/s2 < 0.50 \qquad (3)$$

where dn denotes the thickness along the optical axis of the negative lens composing the cemented lens disposed on the object side in the two cemented lenses, and s2 denotes a combined thickness along the optical axis of the second lens group G2.

Conditional expression (3) specifies the thickness of the negative lens composing the cemented lens elements disposed on the object side in the two cemented lenses and the combined thickness along the optical axis of the second lens group G2. The second lens group G2 receiving the incident light from the first lens group G1 having the negative refractive power corrects the on-axis aberrations such as spherical aberration mainly by use of the object-sided surface but is hard to simultaneously correct spherical aberration and coma only the positive lens, and can well correct the aberrations by skillfully adding the negative lens. When the value exceeds the upper limit of conditional expression (3), the total thickness of the second lens group G2 decreases, and hence it follows that a burden on each of the lenses within the second lens group G2 becomes heavy. Consequently, the radius of curvature excessively decreases to thereby cause a hindrance to the correction of spherical aberration and coma and cause the inability of extending an exit pupil far due to intensified power of each lens, which is an undesirable aspect. Further, it is preferable for ensuring the effect of the embodiment that the upper limit of conditional expression (3) is set to 0.45. Moreover, it is also preferable for further ensuring the effect of the embodiment that the upper limit of conditional expression (3) is set to 0.43. On the other hand, when the value falls below the lower limit of conditional expression (3), the thickness of the image-sided negative lens decreases, and therefore, when in the attempt to keep the same power, the radius of curvature is reduced, with the result that the off-axis aberrations are hard to be corrected. Further, the Petzval sum becomes excessively large, the image plane gets curved in the minus direction on the whole, which is an undesirable aspect. Moreover, it is also preferable for ensuring the effect of the embodiment that the lower limit of conditional expression (3) is set to 0.05. In addition, it is also preferable for further ensuring the effect of the embodiment that the lower limit of conditional expression (3) is set to 0.1.

Further, it is desirable to satisfy the following conditional expression (4):

$$0.05 < sp/dn < 1.00 \qquad (4)$$

where dn denotes the thickness along the optical axis of the negative lens composing the cemented lens disposed on the object side in the two cemented lenses, and sp denotes a distance between the two cemented lenses.

Conditional expression (4) specifies the thickness along the optical axis of the negative lens composing the cemented lens disposed on the object side in the two cemented lenses and the distance between the two cemented lens elements. When the value exceeds the upper limit of conditional expression (4), the thickness of the negative lens decreases, and therefore, when in the attempt to keep the same power, the radius of curvature is reduced, with the result that there are increased variation in coma as the magnification is varied and off-axis aberrations are hard to be corrected. Alternatively, the distance between the cemented lenses expands, and consequently brightness does not get maintained, while the exit pupil is displaced in the image side direction, which is an undesirable aspect. Further, it is preferable for ensuring the effect of the embodiment that the upper limit of conditional expression (4) is set to 0.8. Moreover, it is also preferable for further ensuring the effect of the embodiment that the upper limit of conditional expression (4) is set to 0.6. On the other hand, when the value falls below the lower limit of conditional expression (4), the thickness of the negative lens composing the cemented lens elements on the object side becomes excessively increased, and therefore the second lens group G2 gets enlarged.

Further, the Petzval sum becomes excessively large, the image plane gets curved in the minus direction on the whole, which is an undesirable aspect. Furthermore, it is preferable for ensuring the effect of the embodiment that the lower limit of conditional expression (4) is set to 0.1. Moreover, it is also preferable for further ensuring the effect of the embodiment that the lower limit of conditional expression (4) is set to 0.15.

Further, it is desirable to satisfy the following conditional expression (5):

$$0.03 < sp/f2 < 0.20 \qquad (5)$$

where sp denotes the distance between the two cemented lenses, and f2 denotes a focal length of the second lens group G2.

Conditional expression (5) specifies the distance between the two cemented lenses and the focal length of the second lens group G2. When the value exceeds the upper limit of conditional expression (5), the focal length of the second lens group G2 decreases, and it is therefore difficult to excellently correct spherical aberration and coma. Alternatively, the distance between the cemented lenses expands, and consequently the brightness does not get maintained, while the exit pupil is displaced in the image side direction, which is an undesirable aspect. Further, it is preferable for ensuring the effect of the embodiment that the upper limit of conditional expression (5) is set to 0.18. Moreover, it is also preferable for further ensuring the effect of the embodiment that the upper limit of conditional expression (5) is set to 0.15. On the other hand, when the value falls below the lower limit of conditional expression (5), the focal length of the second lens group G2 excessively increases, and hence a shift quantity rises, and the distance between the first lens group G1 and the second lens group G2 does not get maintained at the telephoto end state. Moreover, the focal length of the positive lens group becomes larger than required, and the zoom lens system can not be downsized, which is an undesirable aspect. Further, it is preferable for ensuring the effect of the embodiment that the lower limit of conditional expression (5) is set to 0.04. Moreover, it is also preferable for further ensuring the effect of the embodiment that the lower limit of conditional expression (5) is set to 0.05.

Further, it is desirable to satisfy the following conditional expression (6):

$$0.05 < sp/dp < 0.20 \qquad (6)$$

where dp denotes the thickness along the optical axis of the positive lens composing the cemented lens disposed on the image side in the two cemented lenses, and sp denotes the distance between the two cemented lenses.

Conditional expression (6) specifies the thickness along the optical axis of the positive lens composing the cemented lens elements disposed on the image side and a distance between the two cemented lenses. When the value exceeds the upper limit of conditional expression (6), the positive lens has an excessively decreased thickness, and it is therefore difficult to correct lateral chromatic aberration in the telescopic end state. While on the other hand, the distance between the cemented lenses expands, so that an F-number tends to become large (dark) and the exit pupil is displaced in the image side direction, which is an undesirable aspect. Furthermore, it is preferable for ensuring the effect of the embodiment that the upper limit of conditional expression (6) is set to 0.19. Moreover, it is also preferable for further ensuring the effect of the embodiment that the upper limit of conditional expression (6) is set to 0.18. On the other hand, when the value falls below the lower limit of conditional expression (6), the positive lens in the cemented lens elements disposed on the image side has an excessively increased thickness, and consequently the second lens group G2 gets enlarged. Further, the Petzval sum is hard to be corrected, and curvature of field at the wide-angle end state is deteriorated, which is an undesirable aspect. Furthermore, it is preferable for ensuring the effect of the embodiment that the lower limit of conditional expression (6) is set to 0.07. Moreover, it is also preferable for ensuring the effect of the embodiment that the lower limit of conditional expression (6) is set to 0.1.

Further, when the image-sided surface of the negative lens composing the cemented lens disposed on the object side in the two cemented lenses is a concave surface directed to the image side, it is desirable to satisfy the following conditional expression (7):

$$0.01 < sp/Ra < 0.15 \tag{7}$$

where Ra denotes a radius of curvature of the image-sided surface of the negative lens, and sp denotes the distance between the two cemented lenses.

Conditional expression (7) specifies the radius of curvature of the image-sided surface of the negative lens composing the cemented lens disposed on the object side of the two cemented lenses and the distance along the optical axis between the two cemented lenses. When the value exceeds the upper limit of conditional expression (7), the radius of curvature of the image-sided surface of the negative lens decreases, while the fluctuations of coma rise as the magnification is varied, and the off-axis aberrations become hard to be corrected. Alternatively, the distance between the cemented lenses expands, so that the F-number tends to become large (dark) and the exit pupil is displaced in the image-sided direction, which is an undesirable aspect. Furthermore, it is preferable for ensuring the effect of the embodiment that the upper limit of conditional expression (7) is set to 0.12. Moreover, it is also preferable for further ensuring the effect of the embodiment that the upper limit of conditional expression (7) is set to 0.1. On the other hand, when the value falls below the lower limit of conditional expression (7), the negative lens has an excessively increased radius of curvature on the image side, and it is difficult to preferably correct coma, which is an undesirable aspect. Further, it is preferable for ensuring the effect of the embodiment that the lower limit of conditional expression (7) is set to 0.02. Moreover, it is also preferable for further ensuring the effect of the embodiment that the lower limit of conditional expression (7) is set to 0.03.

Furthermore, when the image-sided surface of the negative lens composing the cemented lens disposed on the object side in the two cemented lenses is a concave surface directed to the image side, it is desirable to satisfy the following conditional expression (8):

$$-1.1 \leq (Rb-Ra)/(Rb+Ra) < 7.0 \tag{8}$$

where Ra denotes a radius of curvature of the concave surface, and Rb is a radius of curvature of the object-sided surface of the lens disposed on the image side of the negative lens.

Conditional expression (8) specifies an inverse number of a shape factor of an air lens, which is considered to be the distance defined by the radius of curvature of the image-sided surface of the negative lens of the cemented lens elements disposed on the object side of the two cemented lens elements and by the surface closest to the object side of the lens disposed on the image side just behind the negative lens. It is basically advantageous for correcting coma and curvature of field to set the numerical values as pluses in conditional expression (8), however, when the value exceeds the upper limit of conditional expression (8), a degree of a meniscus lens is excessively intensified, and high-order aberrations might be generated on the contrary, which is an undesirable aspect. Further, it is preferable for ensuring the effect of the embodiment that the upper limit of conditional expression (8) is set to 6.0. Moreover, it is also preferable for further ensuring the effect of the embodiment that the upper limit of conditional expression (8) is set to 5.0. On the other hand, when the value falls below the lower limit of conditional expression (8), the air lens takes a shape directed to the concave surface on the object side, and hence coma is hard to be corrected, which is an undesirable aspect. Furthermore, it is preferable for ensuring the effect of the embodiment that the lower limit of conditional expression (8) is set to −0.2. Moreover, it is also preferable for further ensuring the effect of the embodiment that the lower limit of conditional expression (8) is set to 0.03.

Additionally, in the present embodiment, it is desirable to satisfy the following conditional expression (9):

$$1.77 < nd \tag{9}$$

where nd denotes a refractive index with respect to the d-line of the image-sided negative lens composing the cemented lens disposed on the object side in the cemented lenses disposed within the second lens group G2.

Conditional expression (8) specifies the refractive index, with respect to the d-line ($\lambda$=587.6 nm), of the lens having negative refractive power, which is contained in the second lens group G2. When the value falls below the lower limit of conditional expression (9), the curvature becomes strong enough to generate high-order aberrations. Further, Petzval sum becomes hard to be corrected, and curvature of field is deteriorated in the wide-angle end state, which is an undesirable aspect. With satisfying conditional expression (9), it becomes possible to reduce the radius of curvature and to restrain high-order aberrations. Furthermore, it is preferable for ensuring the effect of the embodiment that the lower limit of conditional expression (9) is set to 1.80. Moreover, it is also preferable for further ensuring the effect of the embodiment that the lower limit of conditional expression (9) is set to 1.90, and the Petzval sum rises, thereby enabling the effect of the present embodiment to be further ensured.

Further, it is desirable to satisfy the following conditional expression (10):

$$0.15 < ndn - ndp < 0.50 \tag{10}$$

where ndp denotes an average of refractive indices of the positive lenses contained in the two cemented lenses, and ndn denotes an average of the refractive indices of the negative lenses thereof.

Conditional expression (10) specifies a ratio of the average of the refractive indices of the positive lenses to the average of the refractive indices of the negative lenses of the cemented lens elements included within the second lens group G2. When the value exceeds the upper limit of conditional expression (10), a difference in refractive index between the positive lens and the negative lens is excessively large, and hence Petzval sum increases excessively with the result that the image plane deviates on the minus side, which is an undesirable aspect. Furthermore, it is preferable for ensuring the effect of the embodiment that the upper limit of conditional expression (10) is set to 0.40. Moreover, it is also preferable for further ensuring the effect of the embodiment that the upper limit of conditional expression (10) is set to 0.35. On the other hand, when the value falls below the lower limit of conditional expression (10), because of the small difference in refractive index between the positive lens and the negative lens, Petzval sum becomes too small, resulting in the difficulty of correcting astigmatism and curvature of field. Particularly, as getting away from the optical axis, off-axis aberrations are not improved such as a curvature of a sagittal image plane, and therefore widening of an angle of view cannot be attained, which is an undesirable aspect. Further, it is preferable for ensuring the effect of the embodiment that the lower limit of conditional expression (10) is set to 0.17. Moreover, it is also preferable for further ensuring the effect of the embodiment that the lower limit of conditional expression (10) is set to 0.19.

Further, in the present embodiment, it is desirable to satisfy the following conditional expression (11):

$$20 < vdp - vdn < 55 \tag{11}$$

where vdp denotes an average of Abbe numbers of the positive lenses contained in the two cemented lenses, and vdn denotes an average of Abbe numbers of the negative lenses thereof.

Conditional expression (11) specifies a ratio of the average of Abbe numbers of the positive lenses to the average of Abbe numbers of the negative lenses of the cemented lens elements included within the second lens group G2. When the value exceeds the upper limit of conditional expression (11), a difference in Abbe number between the positive lens and the negative lens becomes large, and hence chromatic aberration is excessively corrected, whereby chromatic aberration with respect to the g-line gets displaced greatly in an overcorrection direction and a color blur occurs at the wide-angle end state, which is an undesirable aspect. Furthermore, it is preferable for ensuring the effect of the embodiment that the upper limit of conditional expression (11) is set to 55. Moreover, it is also preferable for further ensuring the effect of the embodiment that the upper limit of conditional expression (11) is set to 45. On the other hand, when the value falls below the lower limit of conditional expression (11), the difference in Abbe number between the positive lens and the negative lens becomes too small, both of longitudinal chromatic aberration and lateral chromatic aberration are deficient of their corrections, and it is difficult to take the balance of the lateral chromatic aberration over entire range from the wide-angle end state to the telephoto end state, which is an undesirable aspect. Further, it is preferable for ensuring the effect of the embodiment that the lower limit of conditional expression (11) is set to 25. Moreover, it is also preferable for further ensuring the effect of the embodiment that the lower limit of conditional expression (11) is set to 30.

Further, the present zoom lens system ZL has a configuration that at least a part of the second lens group G2 shifts in a direction including a component perpendicular to the optical axis. With this configuration, it is feasible to obtain preferable optical performance with the decreased decentering coma upon vibration reduction.

Furthermore, the present zoom lens system ZL has a configuration that at least one of the cemented lenses of the second lens group G2 shifts in a direction including a component perpendicular to the optical axis. With this configuration, it is feasible to obtain preferable optical performance with the decreased decentering coma upon vibration reduction.

Moreover, in this type of zoom lens system, it is preferable that the first lens group G1 includes, in order from the object side, one or two single lenses having negative refractive power and a single lens having positive refractive power, thereby enabling the first lens group G1 itself to be downsized and a height of the off-axis light beams to be maintained low. Therefore, high-order components of spherical aberration can be restrained, and aberrations can be well corrected.

Further, in this type of zoom lens system, it is preferable that in the cemented lenses disposed within the second lens group G2, the image-sided negative lens composing the cemented lens disposed on the object side is a concave surface directed to the image side. This configuration enables the exit pupil to be positioned toward the object while correcting coma well.

Still further, in this type of zoom lens system, it is preferable that the second lens group G2 has three lens elements, thereby enabling spherical aberration and coma to be corrected though small in number of composing lens elements and enabling the downsizing of the zoom lens system ZL to be attained.

Yet further, in this type of zoom lens system, it is preferable that the second lens group G2 includes, in order from the object side, a positive single lens, a cemented lens constructed by a positive lens and a negative lens, and a cemented lens constructed by a positive lens and a negative lens.

Herein, the zoom lens system of the negative-leading type is capable of well correcting the aberrations with the comparatively simple configuration, however, it is necessary for attaining the correction to cancel various aberrations each other by disposing the positive lens elements and the negative lens elements in a well-balanced manner within the positive lens group. Therefore, the positive lens group includes a triplet type such as a positive/negative/positive type in many cases. Besides, if this configuration is replaced by disposing single lenses such as a positive lens, a negative lens and a positive lens, coma, which occurs often after the positive lens positioned closest to the object side within the second lens groups, is required to be corrected by the three single lenses, and such a problem arises that an assembling property is deteriorated due to the increase in aberrations which occur in the respective lens elements. Such being the case, the present embodiment involves setting a modified triplet type consisting of a positive single lens, a positive/negative cemented lens and a negative/positive cemented lens by dividing the negative lens elements of the second lens group G2 in front and in rear, thereby enabling sensitivities of the respective elements to be distributed and aberrations to be well corrected.

Moreover, in this type of zoom lens system, it is preferable that the surface closest to the image side of the cemented lens disposed on the image side in the two cemented lenses is formed in an aspherical shape. This configuration enables spherical aberration and the upper coma to be well corrected.

Figure 13A:
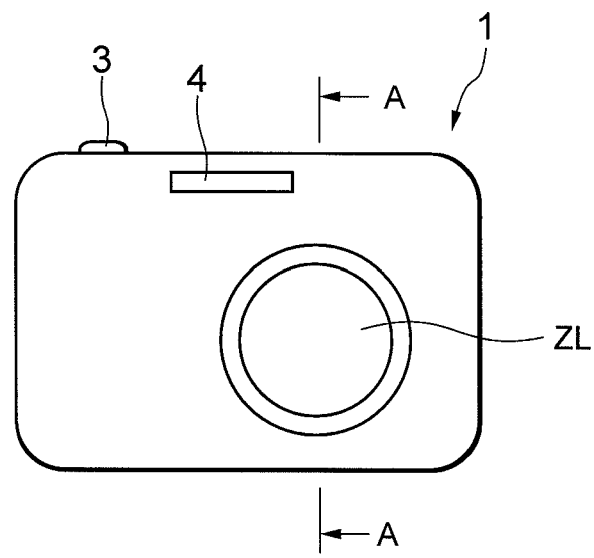
Figure 13B:
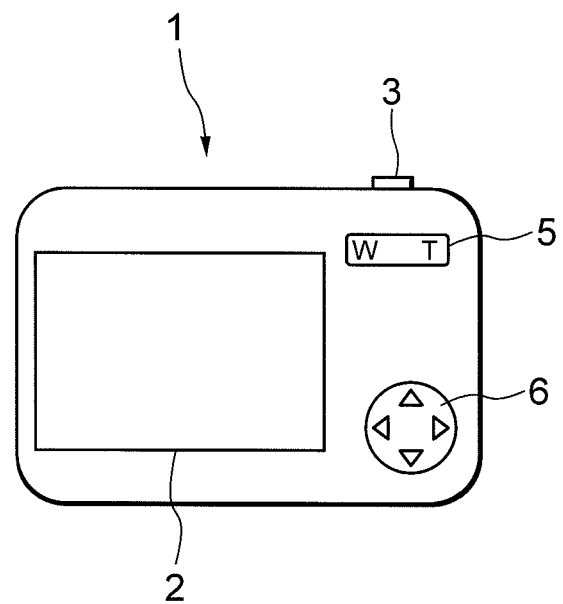
Figure 14:
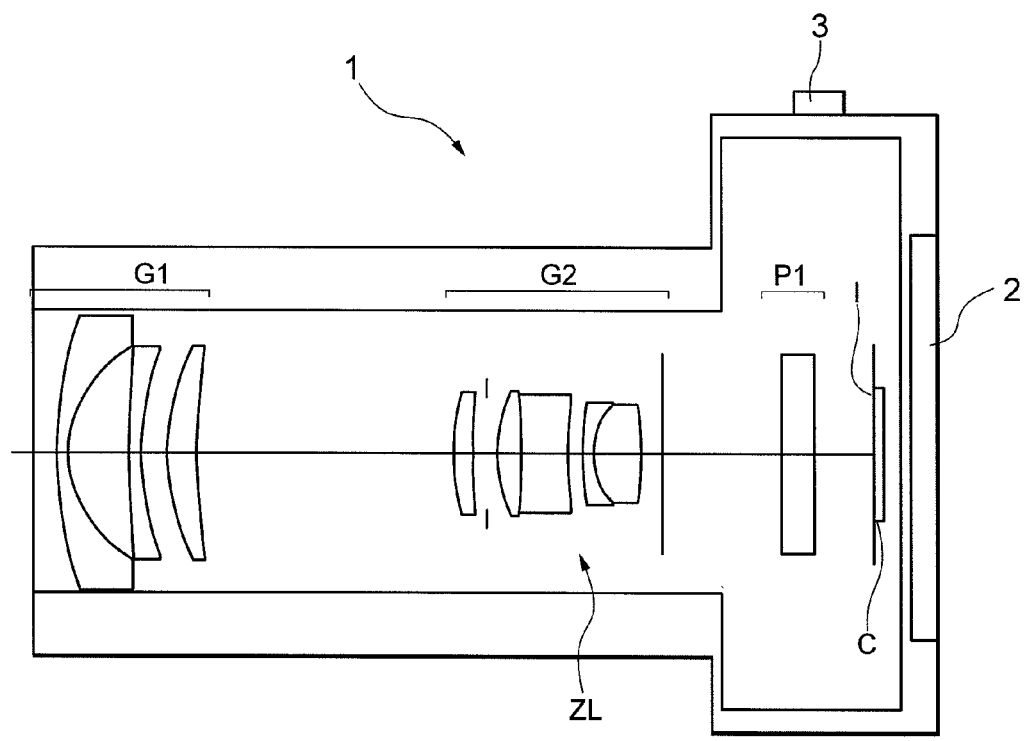
FIG. 14 is a sectional view taken along a line A-A in FIG. 13A.

FIGS. 13 and 14 show a configuration of an electronic still camera 1 (which will hereinafter simply be referred to as the camera) by way of an optical apparatus including the zoom lens system ZL described above. In this camera 1, when pressing an unillustrated power button, an unillustrated shutter for a photographing lens (the zoom lens system ZL) is released, then light beams from an unillustrated object are condensed by the zoom lens system ZL, and an image is formed on an imaging device C (e.g., CCD (Charge Coupled Device), a CMOS (Complementary Metal Oxide Semiconductor), etc) disposed on an image plane I. The object image formed on the imaging device C is displayed on a liquid crystal monitor 2 disposed in rear of the camera 1. A photographer, after determining a composition of the object image while watching the liquid crystal monitor 2, presses down a release button 3 to capture the image with the imaging device C, and records and stores the image in an unillustrated memory.

Disposed on this camera 1 are an auxiliary light emitting unit 4 that emits auxiliary beams of light when the object is dark, a wide-angle (W)-telephoto (T) button 5 used when zooming the zoom lens system ZL from a wide-angle end state (W) to a telephoto end state (T), and function buttons 7 employed for setting a variety of conditions of the camera 1. Note that FIG. 13 exemplifies a compact type of camera in which the camera 1 and the zoom lens system ZL are integrally formed, however, the optical apparatus may involve applying a single lens reflex camera in which a lens barrel including the zoom lens system ZL is detachably attachable to a camera body.

Contents described below can be properly adopted within a range that does not deteriorate optical performance.

The discussion made so far and the embodiment that will hereinafter be illustrated has exemplified or will exemplify a 2-group configuration, however, other group configurations such as a 3-group configuration and a 4-group configuration can be applied. To be specific, there are exemplified configurations such as a configuration of adding a positive or negative lens or a lens group on the side closest to the object and a configuration of adding a positive or negative lens or a lens group on the side closest to the image.

Moreover, such a focusing lens group may be taken that a single or a plurality of lens groups or a segmental lens group is moved in the direction of the optical axis to thereby perform focusing on a near-distance object point from an infinite-distance object point. In this case, the focusing lens group can be applied to an auto focus and is suited to be driven by a motor (such as an ultrasonic motor) for the auto focus. Especially, it is desirable that at least a part of the first lens group G1 or the second lens group G2 serves as the focusing lens group. Furthermore, the whole of the zoom lens system ZL or the imaging surface may be moved.

Moreover, a vibration reduction lens group which corrects an image blur caused by a hand vibration (camera shake) may also be constructed in a way that shifts a lens group or a segmental lens group in the direction perpendicular to the optical axis. In particular, it is preferable that at least a part of the second lens group G2 is constructed as the vibration reduction lens group. Thus, the zoom lens system ZL according to the present embodiment can function as the so-called vibration reduction zoom lens system.

Moreover, any lens surface may be formed as a spherical surface, a plane surface or an aspherical surface. When a lens surface is a spherical surface or a plane surface, processing and assembly of the lens become easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

An aperture stop S is, it is preferable, disposed in the vicinity or within the second lens group G2, however, an available configuration is that a lens frame substitutes for a role of the aperture stop without providing a member as the aperture stop.

Furthermore, each lens surface may be coated with an anti-reflection film having a high transmittance in a broad wave range in order to attain the high contrast and the high optical performance by reducing a flare and ghost.

The zoom lens system ZL according to the present embodiment has a zoom ratio on the order of 2.0-5.0, preferably, 2.5-4.0.

According to the present embodiment, it is preferable that the first lens group G1 has one positive lens element and one or two negative lens element(s). Further, the first lens group G1 includes, in order from the object side, the lens elements which are disposed in a negative/positive or negative/negative/positive order with air spaces in between.

Moreover, according to the present embodiment, it is preferable that the second lens group G2 includes two positive lens elements and one negative lens element. Further, it is preferable that the second lens group G2 includes, in order from the object side, the lens elements which are disposed in a positive/negative/positive order with air spaces in between.

Further, in the zoom lens system ZL according to the present embodiment, a distance along the optical axis (back focal length) from the image side surface of the lens element disposed closest to the image side to the image plane is preferably set to approximately 1.0-3.0 mm in the minimum state.

Furthermore, in the zoom lens system ZL according to the present embodiment, an image height is set to preferably 5.0-12.5 mm and more preferably 5.0-9.5 mm.

Note that the present embodiment has been discussed in a way that adds the constructive requirements for providing an easy-to-understand description of the present invention, however, as a matter of course, the present invention is not limited to this descriptive mode.

Figure 15:
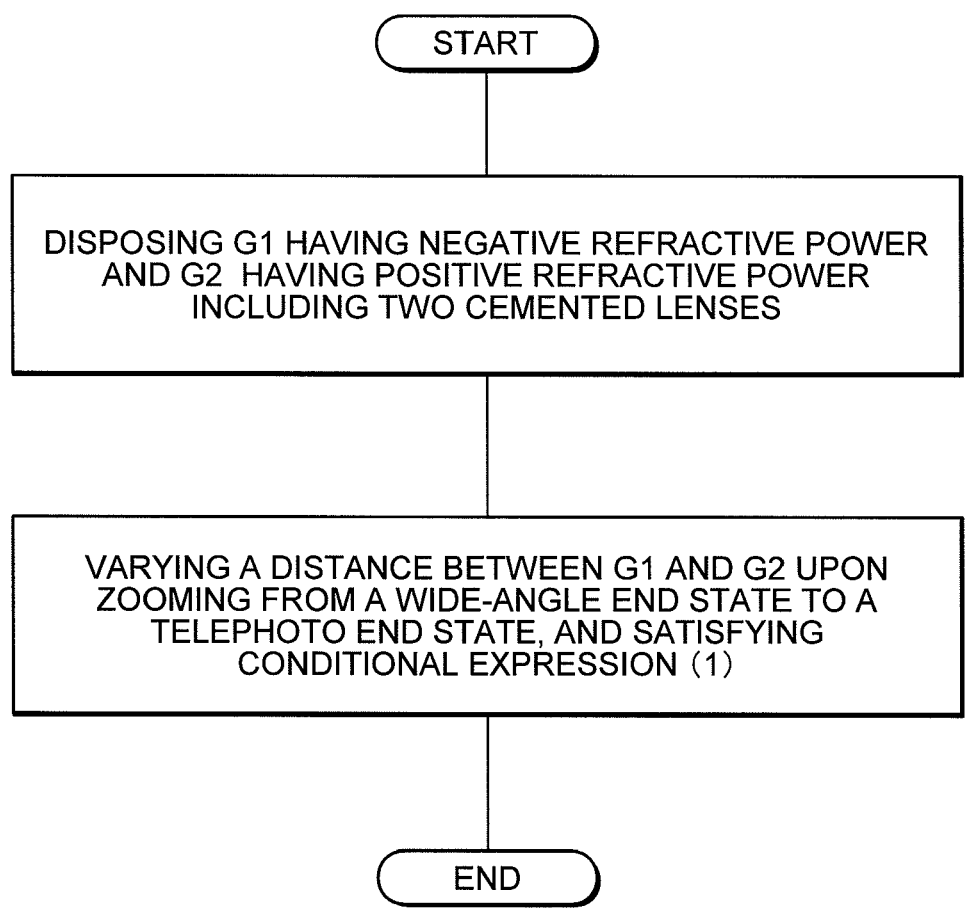
FIG. 15 is a flowchart showing an outline of a method for manufacturing a zoom lens system according to the present embodiment.

An outline of a method for manufacturing the zoom lens system ZL including, in order from an object side, a first lens group G1 and a second lens group G2 will hereinafter be described with reference to FIG. 15.

To begin with, within a cylindrical lens barrel, the first lens group G1 is disposed in a way that has negative refractive power, the second lens group G2 includes respective lenses containing two cemented lenses and is disposed to have positive refractive power on the whole, and the first lens group G1 and the second lens group G2 are disposed so that the distance between the these lens groups varies upon zooming from a wide-angle end state to a telephoto end state as well as being disposed so as to satisfy the following conditional expression (1):

$$0.1 < dn/ds < 0.5 \tag{1}$$

where ds denotes a thickness along the optical axis of the two cemented lenses from the surface closest to the object side to the surface closest to the image side, and dn denotes a thickness along the optical axis of the negative lens composing the cemented lens disposed on the object side in the two cemented lenses.

WORKING EXAMPLES

Respective Examples of the present invention will hereinafter be described with reference to the accompanying drawings. FIG. 1 is a sectional view showing a configuration of a zoom lens system ZL according to the present working example, in which downward arrowheads in FIG. 1 indicate how the respective lens groups move with respect to distribution of the refractive power of the zoom lens system ZL and a change of a focal length state from a wide-angle end state (W) to a telephoto end state (T). A zoom lens system ZL1 in FIG. 1 is composed of, in order from the object side, a first lens group G1 having negative refractive power and a second lens group G2 having positive refractive power. The zoom lens system ZL1 is constructed so that the distance between the first lens group G1 and the second lens group G2 varies when a lens position state changes from the wide-angle end state to the telephoto end state.

Furthermore, a low-pass filter P1 for cutting a spatial frequency equal to or higher than a limit resolution of a solid-state imaging device such as the CCD disposed on the image plane I, is provided between the second lens group G2 and the image plane I.

In each of Examples, an aspherical surface is expressed by the following expression (a) when y denotes a height in the direction vertical to the optical axis, S(y) denotes a distance (sag quantity) along the optical axis from a tangent plane of a vertex of each aspherical surface at the height y up to each aspherical surface, r denotes a radius of curvature (paraxial radius of curvature) of the reference sphere, k denotes a conical coefficient and An denotes an n-th order aspherical surface coefficient. Note that [E-n] represents [×10$^{-n}$] in the subsequent working examples.

$$S(y)=(y^2/r)/[1+[1-k(y^2/r^2)]^{1/2}]+A3\times|y|^3+A4\times y^4+A6\times y^6+A8\times y^8+A10\times y^{10}$$ (a)

It should be noted that a secondary aspherical surface coefficient A2 is "0" in each of Examples. Further, the aspherical surface is attached with a mark "*" on the left side of a surface number in (Lens Data) of each working example.

Example 1

FIG. 1 is a view showing a configuration of a zoom lens system ZL1 according to Example 1. The zoom lens system ZL1 in FIG. 1 is composed of, in order from an object side, a first lens group G1 having negative refractive power and a second lens group G2 having positive refractive power.

The first lens group G1 has negative refractive power on the whole and is composed of three lenses such as a negative meniscus lens L11 with a convex surface directed to the object side, a negative meniscus lens L12 with a convex surface directed to the object side and a positive meniscus lens L13 with a convex surface directed to the object side. The second lens group G2 has positive refractive power on the whole and is composed of five lenses such as a positive meniscus lens L21 with a convex surface directed to the object side, an aperture stop S, a cemented lens constructed by a double convex lens L22 cemented with a double concave lens L23, and a cemented lens constructed by a negative meniscus lens L24 with a concave surface directed to an image side cemented with a double convex lens L25. Further, a flare stopper FS is disposed between the second lens group G2 and the image plane I and moves together with the second lens group G2 upon zooming from a wide-angle end state to a telephoto end state.

The following Table 1 shows values of various items of data associated with Example 1. In (Specifications), W denotes a wide-angle end state, M denotes an intermediate focal length state, and T denotes a telephoto end state. The symbol f denotes a focal length, FNO denotes an f-number, 2ω denotes an angle of view, and Bf denotes a back focal length, respectively. Further, in the (Lens Data), i represents a surface number, r denotes for a radius of curvature of the lens surface, vd denotes an Abbe number, and nd denotes a refractive index. Herein, the surface number represents an order of the lens surface from the object side along the direction in which the light beams travel, the surface distance indicates a distance along the optical axis from each optical surface to the next optical surface, and the refractive index and the Abbe number represent values with respect to the d-line (λ=587.6 nm). Herein, the focal length f, the radius of curvature, the surface gap and other items of data described in the following various items of whole data involve using generally [mm] as the unit of the length, however, the optical system acquires the equal optical performance even when proportionally enlarged or reduced and is not therefore limited to this unit. Incidentally, the radius of curvature "0.0000" indicates a plane surface, and the refractive index "1.00000" of the air is omitted. Further, the descriptions of the reference numerals and symbols and the various items of data are the same in the subsequent Examples.

In Example 1, the second lens surface and the fifteenth lens surface are each formed in an aspherical shape. [Aspherical Surface Data] shows values of the conical coefficient k and of the respective aspherical surface coefficients A3-A10.

In Example 1, a distance along the optical axis d1 between the first lens group G1 and the second lens group G2, a distance along the optical axis d2 between the second lens group G2 and a flare stop FS, a distance along the optical axis d3 between flare stop FS and the low-pass filter P1 and a total lens length t1 change upon zooming. (Variable Distance Data) shows variable distances at the respective focal lengths in the wide-angle end state, the intermediate focal length state and the telephoto end state.

(Values for Conditional Expressions) shows respective values for conditional expressions corresponding in Example 1. Note that in (Values for Conditional Expressions), ds denotes the thickness along the optical axis of the two cemented lenses of the second lens group G2 from the surface closest to the object side to the surface closest to the image side, dn denotes the thickness along the optical axis of the negative lens composing the cemented lens disposed on the object side, da denotes the thickness along the optical axis of the cemented lens disposed on the object side, s2 denotes the combined thickness along the optical axis of the second lens group, sp denotes the distance between the two cemented lenses, f2 denotes the focal length of the second lens group G2, dp denotes the thickness along the optical axis of the positive lens composing the cemented lens disposed on the image side, Ra denotes the radius of curvature of the image-sided surface of the negative lens composing the cemented lens disposed on the object side, Rb denotes the radius of curvature of the object-sided surface of the lens disposed on the image side of the negative lens, nd denotes the refractive index of the negative lens with respect to the d-line, ndp indicates the average of the refractive indexes of the positive lenses of the two cemented lenses included in the second lens group G2, ndn denotes the average of the refractive indexes of the negative lenses, vdp denotes the average of the Abbe numbers of the positive lenses, and vdn denotes the average of the Abbe numbers of the negative lenses, respectively. The descriptions of these symbols are the same in the subsequent Examples.

TABLE 1

(Specifications)

| | W | M | T |
|---|---|---|---|
| f = | 10.25 | 17.30 | 29.30 |
| Bf = | 5.0 | 5.0 | 5.0 |
| FNO = | 3.35 | 4.27 | 5.86 |
| 2ω = | 82.8° | 52.8° | 32.4° |

(Lens Data)

| i | r | d | νd | nd |
|---|---|---|---|---|
| 1 | 36.0024 | 1.0000 | 40.6 | 1.86400 |
| *2 | 8.7029 | 4.9872 | | |
| 3 | 154.7731 | 1.0000 | 56.2 | 1.65100 |
| 4 | 25.0298 | 2.1744 | | |
| 5 | 20.2406 | 2.4000 | 23.8 | 1.84666 |
| 6 | 68.0762 | (d1) | | |
| 7 | 21.7375 | 1.5448 | 46.6 | 1.81600 |
| 8 | 86.5655 | 1.0000 | | |
| 9 | 0.0000 | 1.0000 | | Aperture Stop |
| 10 | 12.1294 | 2.0000 | 52.3 | 1.75500 |
| 11 | −49.2501 | 4.0000 | 28.3 | 2.00330 |
| 12 | 49.9954 | 1.1718 | | |
| 13 | 59.1641 | 1.0000 | 40.8 | 1.88300 |
| 14 | 6.7205 | 3.8000 | 81.5 | 1.49700 |
| *15 | −23.6706 | (d2) | | |
| 16 | 0.0000 | (d3) | | Flare Stopper |
| 17 | 0.0000 | 3.0700 | 64.2 | 1.51680 |
| 18 | 0.0000 | (Bf) | | |

(Aspherical Surface Data)

Surface Number: 2

κ = 0.5308
A3 = 0.00000E+00
A4 = 3.18850E−06
A6 = 1.65800E−07
A8 = −2.36010E−09
A10 = 1.05940E−11

Surface Number: 15

κ = −9.4484
A3 = 0.00000E+00
A4 = 2.75190E−06
A6 = 2.97870E−06
A8 = −1.69510E−07
A10 = 5.28710E−09

(Variable Distances Data)

| | W | M | T |
|---|---|---|---|
| f = | 10.25 | 17.30 | 29.30 |
| d1 = | 21.19423 | 8.53464 | 0.99644 |
| d2 = | 1.78577 | 3.26871 | 5.79284 |
| d3 = | 9.57679 | 15.50852 | 25.60507 |
| tl = | 67.70495 | 62.46001 | 67.54250 |

(Values for Conditional Expressions)

(1) dn/ds = 0.334
(2) dn/da = 0.667
(3) dn/s2 = 0.258
(4) sp/dn = 0.293
(5) sp/f2 = 0.064
(6) sp/dp = 0.308
(7) sp/Ra = 0.023
(8) (Rb − Ra)/(Rb + Ra) = 0.084
(9) nd = 2.0033
(10) ndn − ndp = 0.317
(11) νdp − νdn = 32.42

Figure 2A:
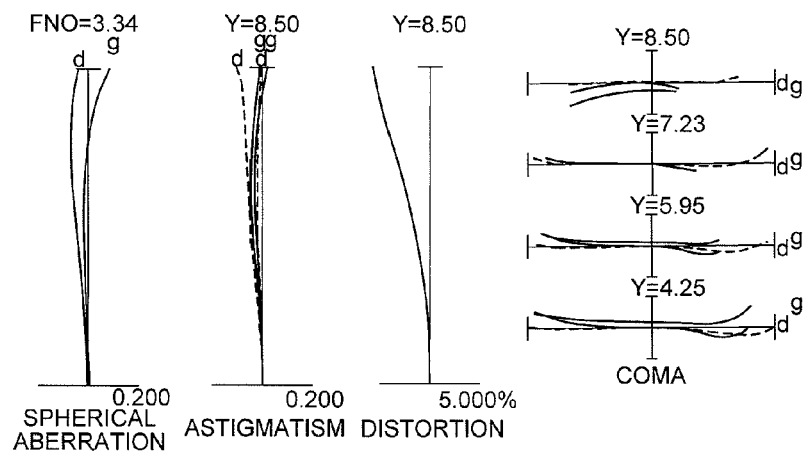
Figure 2B:
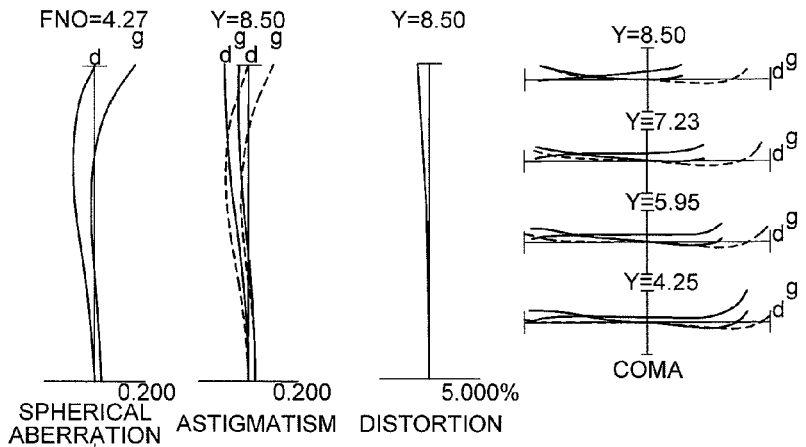
Figure 2C:
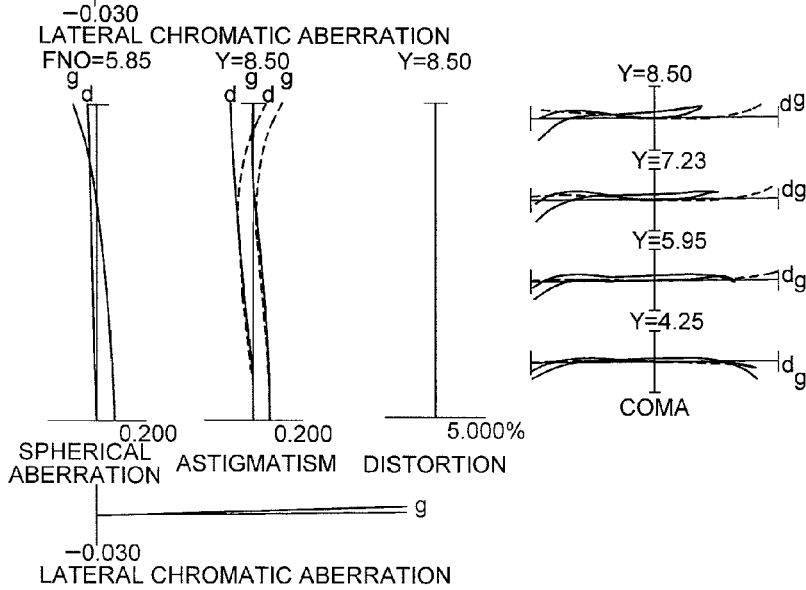

FIGS. 2A, 2B and 2C are diagrams of various aberrations in an infinite-distance focusing state in Example 1, in which FIG. 2A is the diagrams of the various aberrations in a wide-angle end state, FIG. 2B is the diagrams of the various aberrations in an intermediate focal length state, and FIG. 2C is the diagram of the various aberrations in a telephoto end state.

In respective aberration diagrams, FNO represents an f-number, Y denotes an image height, d denotes d-line (λ=587.6 nm) and g denotes g-line (λ=435.6 nm), respectively. Further, the diagram of spherical aberration shows the f-number corresponding to the maximum aperture, diagrams of astigmatism and distortion show the maximum value of the image height Y, and diagrams of coma show the value of each image height. Moreover, in the aberration diagram showing astigmatism, a solid line indicates a sagittal image plane, and a broken line indicates a meridional image plane. Note that the descriptions of these aberration diagrams are the same in the subsequent Examples. As obvious from these aberration diagrams according to Example 1, it is understood that the various aberrations are well corrected in each focal length state from the wide-angle end state to the telephoto end state, and the excellent optical performance is exhibited.

Example 2

Figure 3:
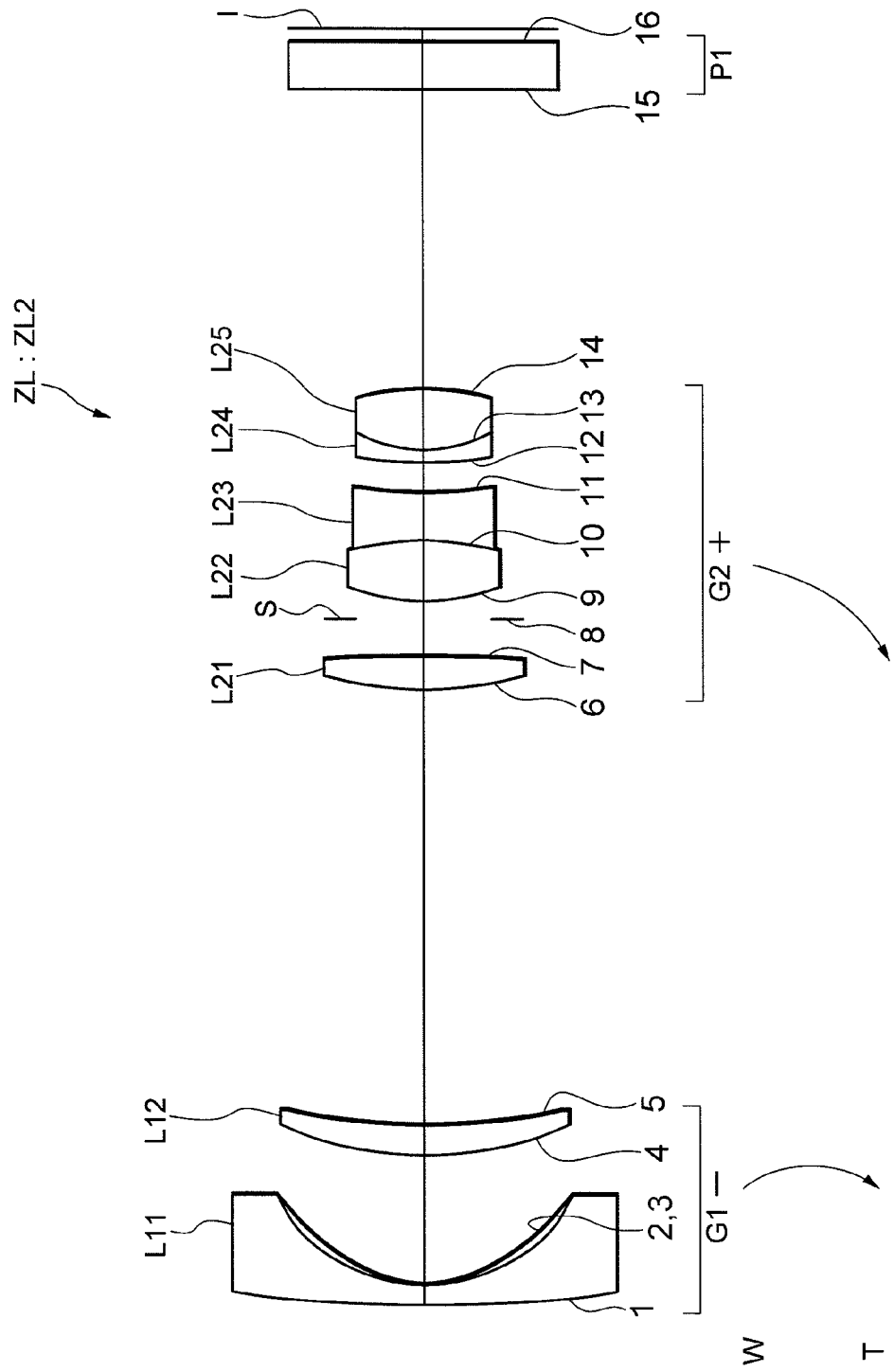
FIG. 3 is a sectional view showing a configuration of a zoom lens system according to Example 2.

FIG. 3 is a view showing a configuration of a zoom lens system ZL2 according to Example 2. The zoom lens system ZL2 in FIG. 3 is composed of, in order from an object side, a first lens group G1 having negative refractive power and a second lens group G2 having positive refractive power.

The first lens group G1 has negative refractive power on the whole and is composed of, in order from the object side, two lenses such as a composite type negative meniscus aspherical lens L11 constructed by a glass material and a resin material with a convex surface directed to the object side, and a positive meniscus lens L12 with a convex surface directed to the object side. The second lens group G2 has positive refractive power on the whole and is composed of five lenses such as a double convex lens L21, an aperture stop S, a cemented lens constructed by a double convex lens L22 cemented with a double concave lens L23, and a cemented lens constructed by a negative meniscus lens L24 with a convex surface directed to the object side cemented with a double convex lens L25.

The following Table 2 shows values of various items of data associated with Example 2. In Example 2, the third lens surface is formed in the aspherical shape. (Aspherical Surface Data) shows values of the conical coefficient k and of the respective aspherical surface coefficients A3 through A10. In Example 2, the distance d1 along the optical axis between the first lens group G1 and the second lens group G2, the distance d2 along the optical axis between the second lens group G2 and the low-pass filter P1 and the total lens length t1, vary upon zooming. (Variable Distance Data) shows the variable distances at the respective focal lengths in the wide-angle end state, the intermediate focal length state and the telephoto end state.

TABLE 2

(Specifications)

| | W | M | T |
|---|---|---|---|
| f = | 10.00 | 15.00 | 27.00 |
| Bf = | 1.0 | 1.0 | 1.0 |
| FNO = | 3.50 | 4.10 | 5.60 |
| 2ω = | 84.4° | 60.1° | 35.1° |

(Lens Data)

| i | r | d | νd | nd |
|---|---|---|---|---|
| 1 | 110.3844 | 1.2000 | 49.6 | 1.77250 |
| 2 | 10.6000 | 0.1200 | 38.1 | 1.55389 |
| *3 | 7.7780 | 8.4137 | | |
| 4 | 21.8009 | 2.0000 | 23.1 | 1.86074 |

TABLE 2-continued

| | | | | |
|---|---|---|---|---|
| 5 | 41.4490 | (d1) | | |
| 6 | 21.7685 | 2.2000 | 81.6 | 1.49700 |
| 7 | −77.4620 | 2.4786 | | |
| 8 | 0.0000 | 1.2000 | | Aperture stop |
| 9 | 14.5431 | 4.0000 | 64.1 | 1.51680 |
| 10 | −16.1757 | 3.1000 | 49.6 | 1.77250 |
| 11 | 28.0000 | 2.0000 | | |
| 12 | 28.0000 | 0.8000 | 37.2 | 1.83400 |
| 13 | 8.9802 | 4.0000 | 64.1 | 1.51680 |
| 14 | −16.4808 | (d2) | | |
| 15 | 0.0000 | 3.0000 | 64.1 | 1.51680 |
| 16 | 0.0000 | (Bf) | | |

(Aspherical Surface Data)
Surface Number: 3

κ = 0.0375
A3 = 0.22189E−04
A4 = 1.40590E−05
A6 = −2.76700E−07
A8 = 1.87880E−09
A10 = −2.56910E−11

(Variable Distances Data)

| | W | M | T |
|---|---|---|---|
| f = | 10.0 | 15.0 | 27.0 |
| d1 = | 28.80009 | 14.29588 | 1.40325 |
| d2 = | 19.72964 | 25.82014 | 40.43735 |
| tl = | 84.04210 | 75.62839 | 77.35297 |

(Values for Conditional Expressions)

(1) dn/ds = 0.354
(2) dn/da = 0.671
(3) dn/s2 = 0.429
(4) sp/dn = 0.392
(5) sp/f2 = 0.087
(6) sp/dp = 0.500
(7) sp/Ra = 0.054
(8) (Rb − Ra)/(Rb + Ra) = 0.000
(9) nd = 1.7725
(10) ndn − ndp = 0.286
(11) νdp − νdn = 20.71

Figure 4A:
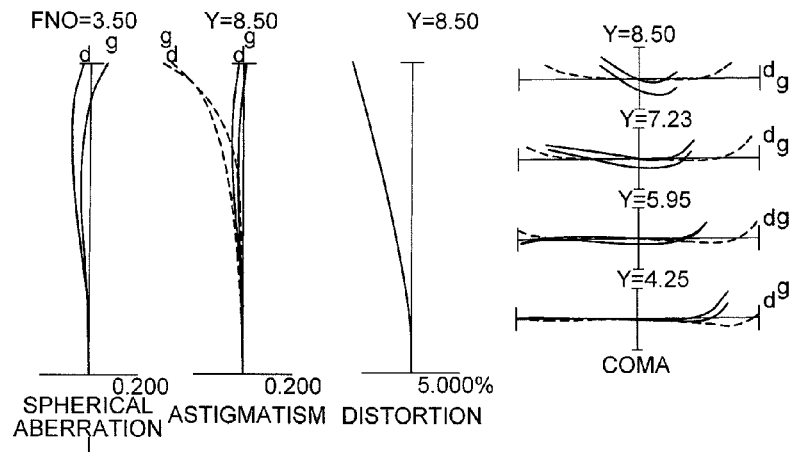
Figure 4B:
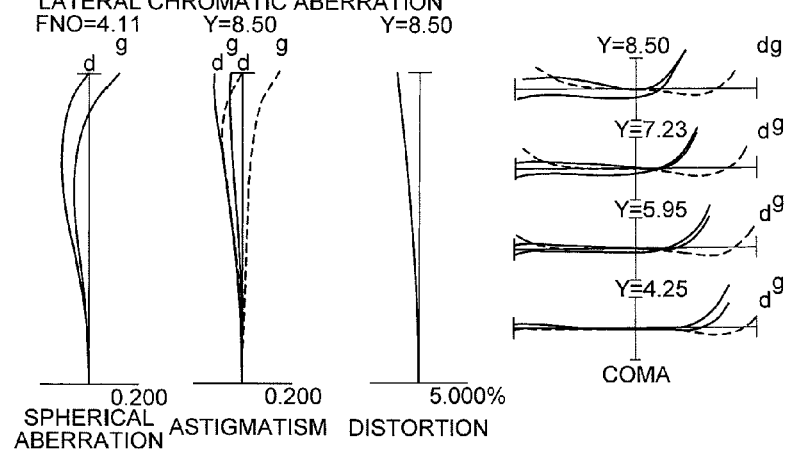
Figure 4C:
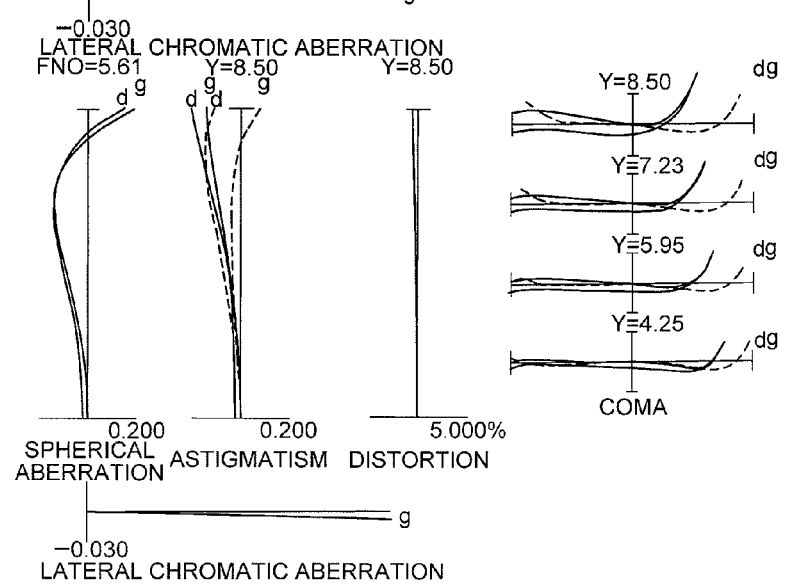

FIGS. 4A, 4B and 4C are diagrams of various aberrations in an infinite-distance focusing state in Example 2, in which FIG. 4A is diagrams of various aberrations in the wide-angle end state, FIG. 4B is diagrams of various aberrations in the intermediate focal length state, and FIG. 4C is diagrams of various aberrations in the telephoto end state. As obvious from these aberration diagrams according to Example 2, it is understood that the various aberrations are well corrected in each focal length state from the wide-angle end state to the telephoto end state, and the excellent image forming performance is exhibited.

Example 3

Figure 5:
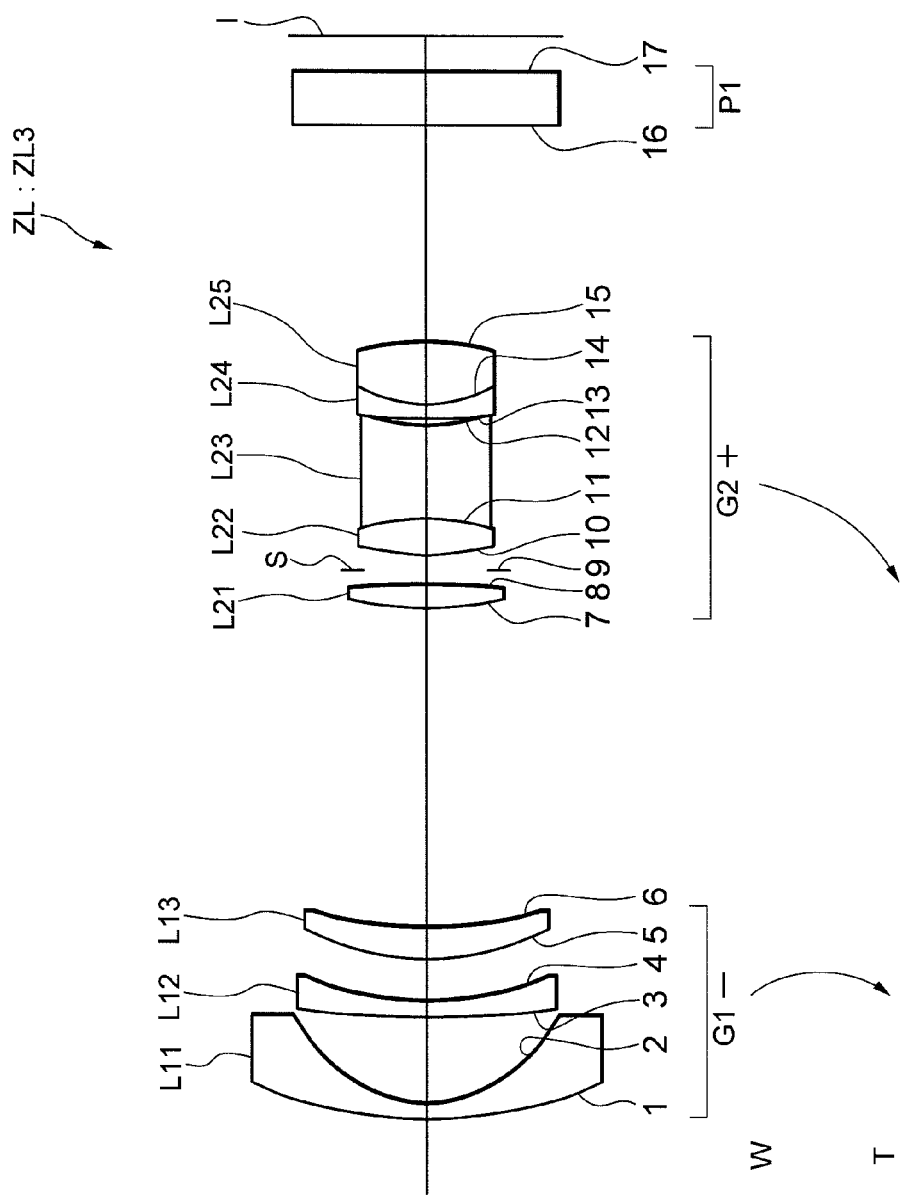
FIG. 5 is a sectional view showing a configuration of a zoom lens system according to Example 3.

FIG. 5 is a view showing a configuration of a zoom lens system ZL3 according to Example 3. The zoom lens system ZL3 in FIG. 5 is composed of, in order from an object side, a first lens group G1 having negative refractive power and a second lens group G2 having positive refractive power.

The first lens group G1 has negative refractive power on the whole and is composed of, in order from the object side, three lenses such as a negative meniscus aspherical lens L11 with a convex surface directed to the object side, a negative meniscus lens L12 with a convex surface directed to the object side and a positive meniscus lens L13 with a convex surface directed to the object side. The second lens group G2 has positive refractive power on the whole and is composed of five lenses such as a double convex lens L21, an aperture stop S, a cemented lens constructed by a double convex lens L22 cemented with a double concave lens L23, and a cemented lens constructed by a negative meniscus lens L24 with a concave surface directed to an image side cemented with a double convex lens L25.

The following Table 3 shows values of the various items of data associated with Example 3. In Example 3, the second lens surface is formed in an aspherical shape. (Aspherical Surface Data) shows values of the conical coefficient k and of respective aspherical surface coefficients A3 through A10. In Example 3, a distance d1 along the optical axis between the first lens group G1 and the second lens group G2, a distance d2 along the optical axis between the second lens group G2 and the low-pass filter P1 and the total lens length t1, vary upon zooming. (Variable Distances Data) shows variable distances at respective focal lengths in the wide-angle end state, the intermediate focal length state and the telephoto end state.

TABLE 3

(Specifications)

| | W | M | T |
|---|---|---|---|
| f = | 10.00 | 15.00 | 27.00 |
| Bf = | 2.4 | 2.4 | 2.4 |
| FNO = | 3.47 | 4.13 | 5.74 |
| 2ω = | 84.8° | 60.2° | 35.0° |

(Lens Data)

| i | r | d | νd | nd |
|---|---|---|---|---|
| 1 | 28.1906 | 1.0000 | 49.2 | 1.76802 |
| *2 | 8.3114 | 5.6780 | | |
| 3 | 65.2135 | 1.0000 | 60.1 | 1.64000 |
| 4 | 21.2771 | 2.7043 | | |
| 5 | 16.8342 | 2.0978 | 23.8 | 1.84666 |
| 6 | 28.4975 | (d1) | | |
| 7 | 19.3977 | 1.5319 | 52.3 | 1.75500 |
| 8 | −67.0330 | 1.0000 | | |
| 9 | 0.0000 | 1.0000 | | Aperture Stop |
| 10 | 16.7695 | 2.3518 | 65.4 | 1.60300 |
| 11 | −14.6803 | 6.0000 | 40.8 | 1.88300 |
| 12 | 13.0479 | 0.5000 | | |
| 13 | 32.6939 | 1.0000 | 35.0 | 1.80100 |
| 14 | 9.1397 | 3.9018 | 55.3 | 1.67790 |
| 15 | −16.5906 | (d2) | | |
| 16 | 0.0000 | 3.5700 | 64.2 | 1.51680 |
| 17 | 0.0000 | (Bf) | | |

(Aspherical Surface Data)
Surface Number: 2

κ = 0.5906
A3 = 0.00000E+00
A4 = 1.40850E−05
A6 = 1.02710E−07
A8 = −3.60730E−10
A10 = 5.96560E−12

(Variable Distances Data)

| | W | M | T |
|---|---|---|---|
| f = | 10.25 | 17.30 | 29.30 |
| d1 = | 20.78385 | 10.15898 | 0.71465 |
| d2 = | 13.98095 | 19.49597 | 32.73202 |
| tl = | 70.50044 | 65.39059 | 69.18231 |

(Values for Conditional Expressions)

(1) dn/ds = 0.436
(2) dn/da = 0.750
(3) dn/s2 = 0.347
(4) sp/dn = 0.083

TABLE 3-continued (5) sp/f2 = 0.027
(6) sp/dp = 0.128
(7) sp/Ra = 0.038
(8) (Rb − Ra)/(Rb + Ra) = 0.429
(9) nd = 1.8830
(10) ndn − ndp = 0.202
(11) vdp − vdn = 22.53

Figure 6A:
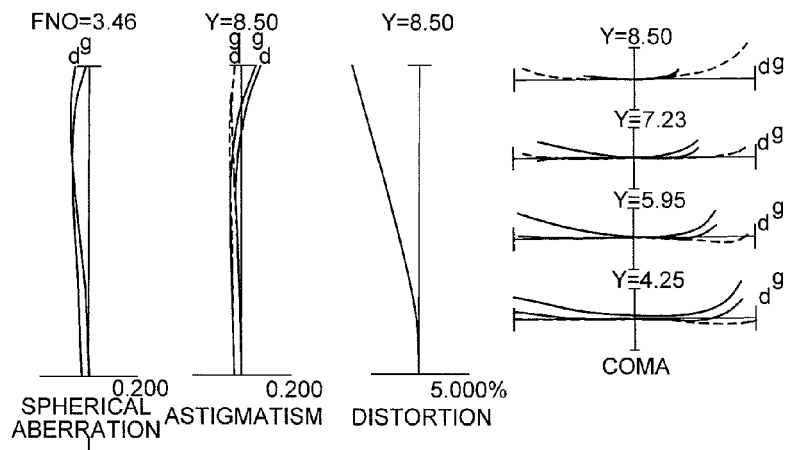
Figure 6B:
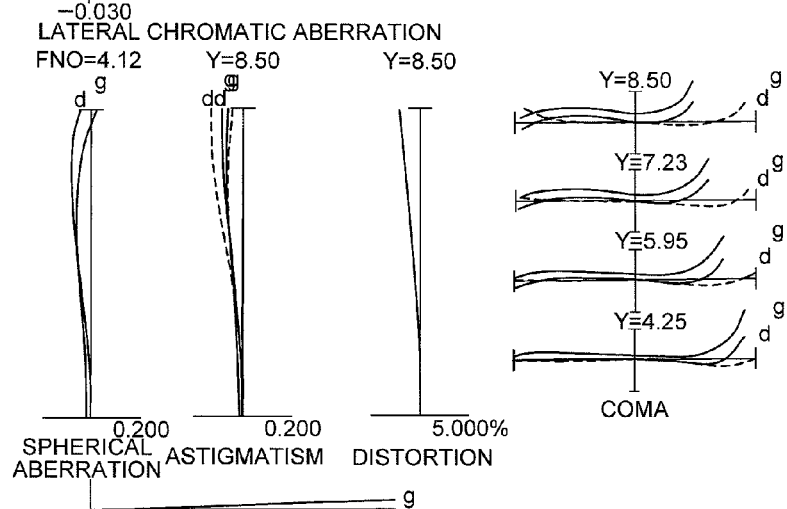
Figure 6C:
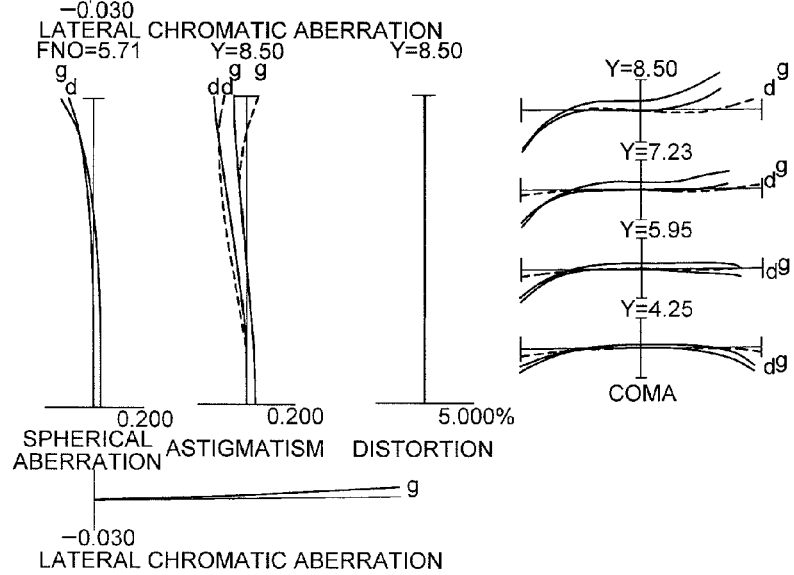

FIGS. 6A, 6B and 6C are diagrams of various aberrations in an infinite-distance focusing state in Example 3, in which FIG. 6A is diagrams of various aberrations in the wide-angle end state, FIG. 6B is diagrams of various aberrations in the intermediate focal length state, and FIG. 6C is diagrams of various aberrations in the telephoto end state. As obvious from these aberration diagrams, according to Example 3, it is understood that the various aberrations are well corrected in each focal length state from the wide-angle end state to the telephoto end state, and the excellent image forming performance is exhibited.

Example 4

FIG. 7 is a view showing a configuration of a zoom lens system ZL4 according to Example 4. The zoom lens system ZL4 in FIG. 7 is composed of, in order from an object side, a first lens group G1 having negative refractive power and a second lens group G2 having positive refractive power.

The first lens group G1 has negative refractive power on the whole and is composed of, in order from the object side, two lenses such as a composite type negative meniscus aspherical lens L11 constructed by a glass material and a resin material with a convex surface directed to the object side, and a positive meniscus lens L12 with a convex surface directed to the object side. The second lens group G2 has positive refractive power on the whole and is composed of five lenses such as a double convex lens L21, an aperture stop S, a cemented lens constructed by a double convex lens L22 cemented with a double concave lens L23, and a cemented lens constructed by a negative meniscus lens L24 with a concave surface directed to an image side cemented with a double convex lens L25.

The following Table 4 shows values of the various items of data associated with Example 4. In Example 4, the second lens surface is formed with an aspherical shape. (Aspherical Surface Data) shows values of conical coefficient k and of respective aspherical surface coefficients A3 through A10. In Example 4, a distance d1 along the optical axis between the first lens group G1 and the second lens group G2, a distance d2 along the optical axis between the second lens group G2 and the low-pass filter P1 and the total lens length t1, vary upon zooming. (Variable Distances Data) shows variable distances at respective focal lengths in the wide-angle end state, the intermediate focal length state and the telephoto end state.

TABLE 4

(Specifications)

|  | W | M | T |
|---|---|---|---|
| f = | 10.00 | 17.00 | 28.00 |
| Bf = | 4.0 | 4.0 | 4.0 |
| FNO = | 3.44 | 4.29 | 5.67 |
| 2ω = | 84.3° | 53.8° | 33.9° |

(Lens Data)

| i | r | d | vd | nd |
|---|---|---|---|---|
| 1 | 105.0231 | 1.2000 | 49.6 | 1.77250 |
| *2 | 10.2544 | 0.1200 | 38.1 | 1.55389 |
| 3 | 7.6150 | 7.8765 | | |
| 4 | 21.0175 | 2.0000 | 23.1 | 1.86074 |
| 5 | 41.4490 | (d1) | | |
| 6 | 24.2369 | 2.2000 | 81.6 | 1.49700 |
| 7 | −52.6990 | 3.0270 | | |
| 8 | 0.0000 | 1.2000 | Aperture Stop | |
| 9 | 14.5431 | 2.5000 | 64.1 | 1.5168 |
| 10 | −17.8265 | 3.0769 | 49.6 | 1.7725 |
| 11 | 38.5194 | 3.0769 | | |
| 12 | 38.5194 | 0.8000 | 37.2 | 1.83400 |
| 13 | 9.2561 | 4.0000 | 64.1 | 1.51680 |
| 14 | −16.9040 | (d2) | | |
| 15 | 0.0000 | 3.0000 | 64.1 | 1.51680 |
| 16 | 0.0000 | (Bf) | | |

(Aspherical Surface Data)
Surface Number: 3

κ = 0.0375
A3 = 0.22189E−04
A4 = 1.40590E−05
A6 = −2.76700E−07
A8 = 1.87880E−09
A10 = −2.56910E−11

(Variable Distances Data)

|  | W | M | T |
|---|---|---|---|
| f = | 10.25 | 17.30 | 29.30 |
| d1 = | 28.89812 | 10.91266 | 0.81878 |
| d2 = | 16.69140 | 25.23855 | 38.66977 |
| tl = | 83.66687 | 74.22856 | 77.56591 |

(Values for Conditional Expressions)

(1) dn/ds = 0.229
(2) dn/da = 0.552
(3) dn/s2 = 0.155
(4) sp/dn = 1.000
(5) sp/f2 = 0.133
(6) sp/dp = 0.769
(7) sp/Ra = 0.080
(8) (Rb − Ra)/(Rb + Ra) = 0.000
(9) nd = 1.7725
(10) ndn − ndp = 0.286
(11) vdp − vdn = 20.71

Figure 8A:
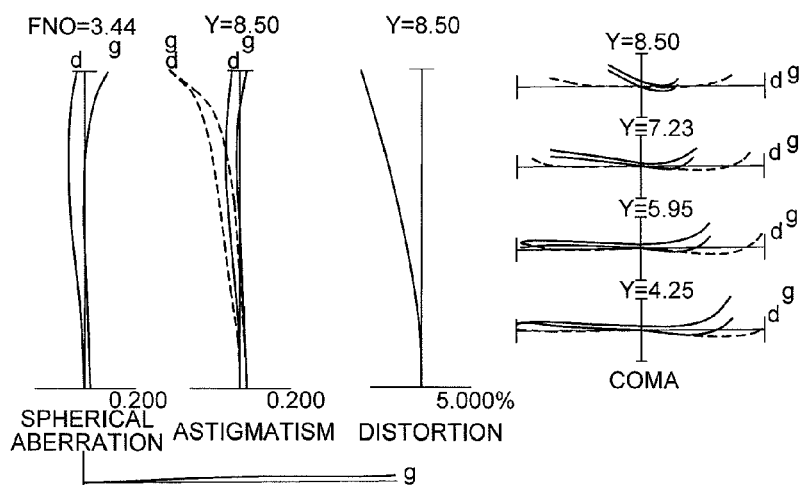
Figure 8B:
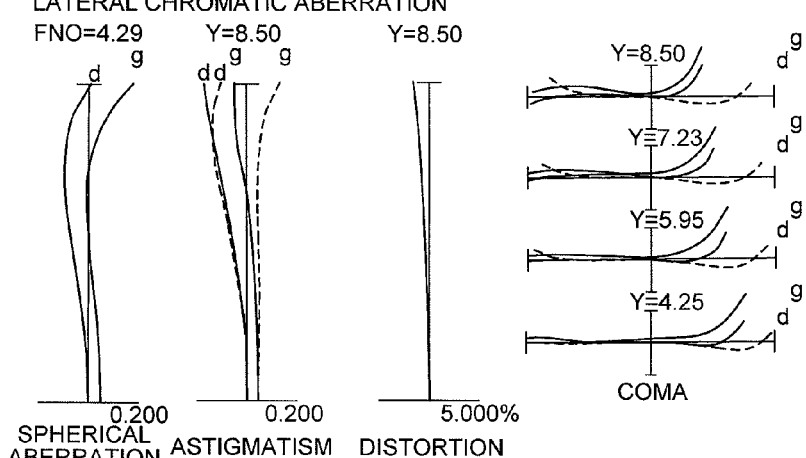
Figure 8C:
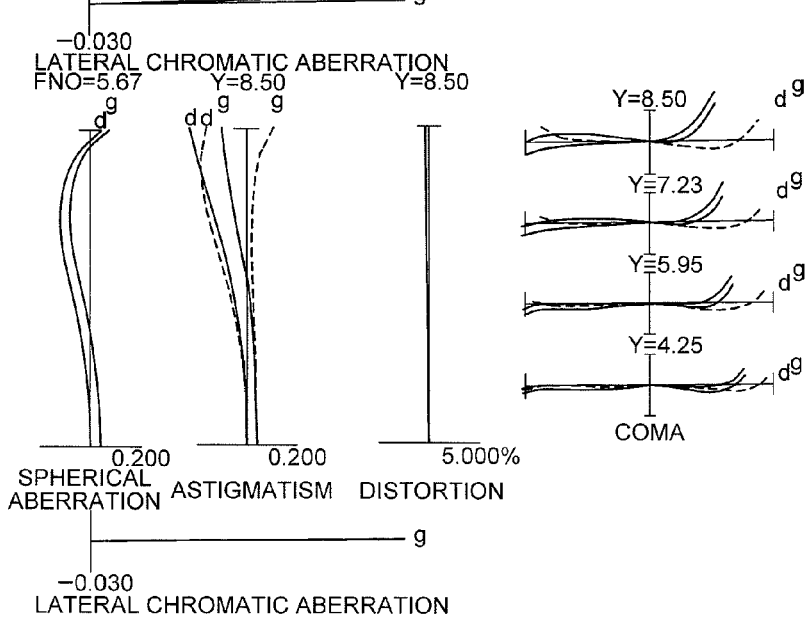

FIGS. 8A, 8B and 8C are diagrams of various aberrations in an infinite-distance focusing state in Example 4, in which FIG. 8A is diagrams of various aberrations in the wide-angle end state, FIG. 8B is diagrams of various aberrations in the intermediate focal length state, and FIG. 8C is diagrams of various aberrations in the telephoto end state. As obvious from these aberration diagrams according to Example 4, it is understood that the various aberrations are well corrected in each focal length state from the wide-angle end state to the telephoto end state, and the excellent optical performance is exhibited.

Example 5

Figure 9:
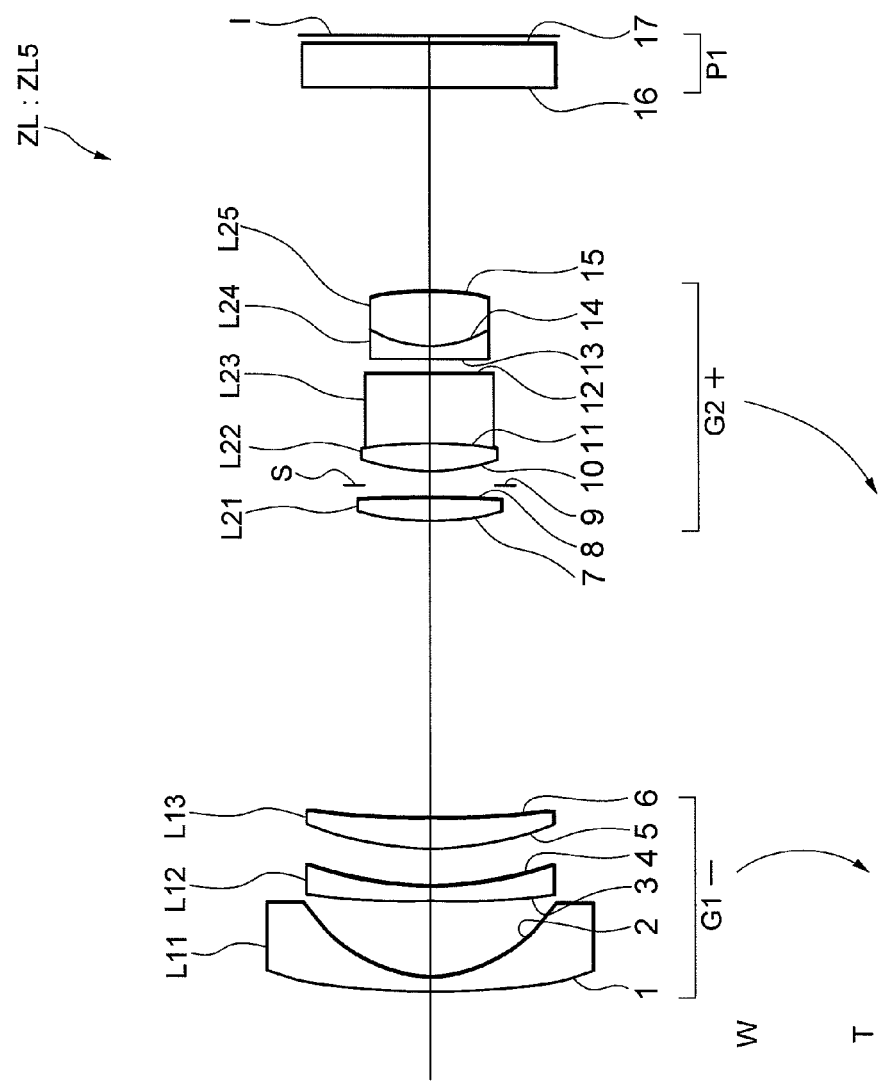
FIG. 9 is a sectional view showing a configuration of a zoom lens system according to Example 5.

FIG. 9 is a view showing a configuration of a zoom lens system ZL5 according to Example 5. The zoom lens system ZL5 in FIG. 9 is composed of, in order from an object side, a first lens group G1 having negative refractive power and a second lens group G2 having positive refractive power.

The first lens group G1 has negative refractive power on the whole and is composed of three lenses such as a negative meniscus lens L11 with a convex surface directed to the object side, a negative meniscus lens L12 with a convex surface directed to the object side and a positive meniscus lens L13 with a convex surface directed to the object side. The second lens group G2 has positive refractive power on the whole and is composed of five lenses such as a double convex lens L21, an aperture stop S, a cemented lens constructed by a double convex lens L22 cemented with a negative meniscus lens L23 with a concave surface directed to the object side, and a cemented lens constructed by a negative meniscus lens L24 with a concave surface directed to an image side cemented with a double convex lens L25.

The following Table 5 shows values of the various items of data associated with Example 5. In Example 5, the second lens surface and the fifteenth lens surface are formed with an aspherical shape. (Aspherical Surface Data) shows values of the conical coefficient k and of respective aspherical surface coefficients A3 through A10. In Example 5, a distance d1 along the optical axis between the first lens group G1 and the second lens group G2, a distance d2 along the optical axis between the second lens group G2 and the low-pass filter P1 and the total lens length t1, vary upon zooming. (Variable Distances Data) shows the variable distances at respective focal lengths in the wide-angle end state, the intermediate focal length state and the telephoto end state.

TABLE 5

(Specifications)

| | W | M | T |
|---|---|---|---|
| f = | 10.25 | 17.30 | 29.30 |
| Bf = | 0.5 | 0.5 | 0.5 |
| FNO = | 3.45 | 4.43 | 6.12 |
| 2ω = | 82.8° | 52.6° | 32.2° |

(Lens Data)

| i | r | d | vd | nd |
|---|---|---|---|---|
| 1 | 46.1233 | 1.0000 | 40.4 | 1.80610 |
| *2 | 8.7561 | 5.5000 | | |
| 3 | 82.6489 | 1.0000 | 55.5 | 1.69680 |
| 4 | 24.5803 | 2.7127 | | |
| 5 | 21.5657 | 2.2000 | 23.8 | 1.84666 |
| 6 | 67.1646 | (d1) | | |
| 7 | 16.5245 | 1.5500 | 46.6 | 1.81600 |
| 8 | −1644.5400 | 1.0000 | | |
| 9 | 0.0000 | 1.0000 | | Aperture Stop |
| 10 | 13.4354 | 2.0000 | 81.5 | 1.49700 |
| 11 | −32.6173 | 5.0000 | 28.3 | 2.00330 |
| 12 | −11300.0000 | 1.0000 | | |
| 13 | 405.8700 | 1.0000 | 40.8 | 1.88300 |
| 14 | 7.7525 | 3.8000 | 81.5 | 1.49700 |
| *15 | −26.2988 | (d2) | | |
| 16 | 0.0000 | 3.0700 | 64.2 | 1.51680 |
| 17 | 0.0000 | (Bf) | | |

(Aspherical Surface Data)

Surface Number: 2

κ = 0.3857
A3 = 0.00000E+00
A4 = 1.07570E−05
A6 = 6.99710E−07
A8 = −8.70590E−09
A10 = 5.46310E−11

Surface Number: 15

κ = −2.7879
A3 = 0.00000E+00
A4 = 1.31940E−04
A6 = 8.95180E−07
A8 = 1.98020E−07
A10 = −7.93330E−09

TABLE 5-continued (Variable Distances Data)

| | W | M | T |
|---|---|---|---|
| f = | 10.25 | 17.30 | 29.30 |
| d1 = | 21.29573 | 8.58080 | 1.00965 |
| d2 = | 14.64685 | 22.09392 | 34.76978 |
| tl = | 68.27525 | 63.00739 | 68.11209 |

(Values for Conditional Expressions)

(1) dn/ds = 0.391
(2) dn/da = 0.714
(3) dn/s2 = 0.306
(4) sp/dn = 0.200
(5) sp/f2 = 0.054
(6) sp/dp = 0.263
(7) sp/Ra = 0.000
(8) (Rb − Ra)/(Rb + Ra) = −1.075
(9) nd = 2.0083
(10) ndn − ndp = 0.446
(11) vdp − vdn = 47.03

Figure 10A:
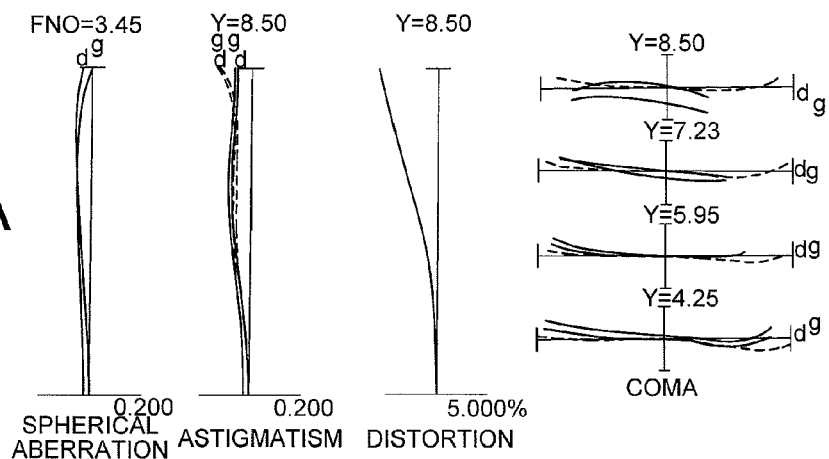
Figure 10B:
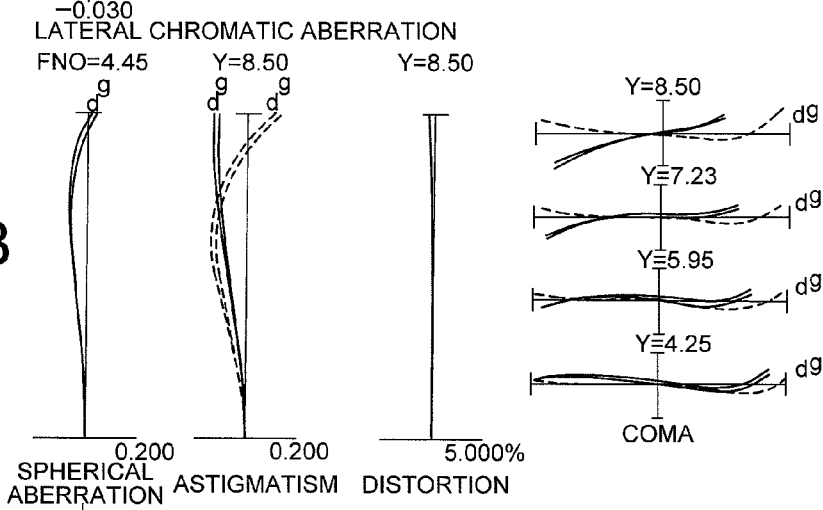
Figure 10C:
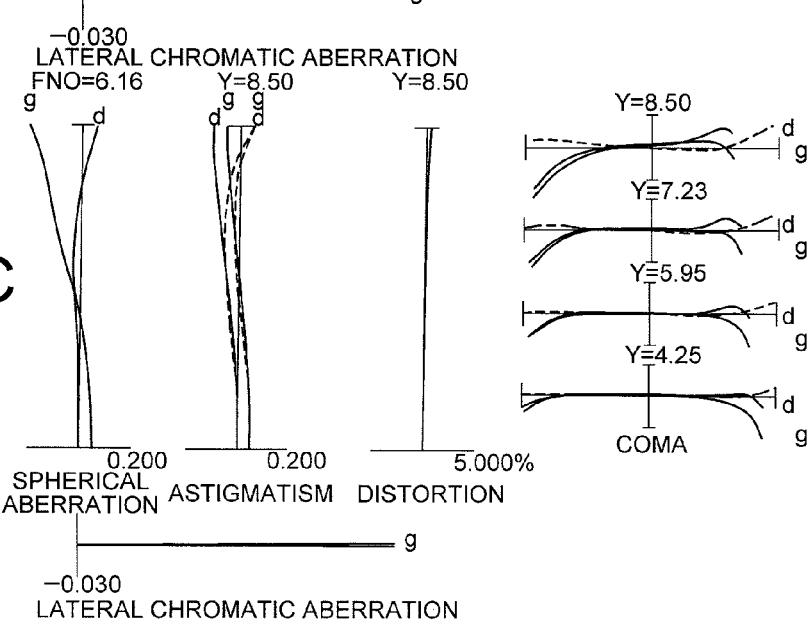

FIGS. 10A, 10B and 10C are diagrams of various aberrations in an infinite-distance focusing state in Example 5, in which FIG. 10A is diagrams of various aberrations in the wide-angle end state, FIG. 10B is diagrams of various aberrations in the intermediate focal length state, and FIG. 10C is diagrams of various aberrations in the telephoto end state. As obvious from these aberration diagrams according to Example 5, it is understood that the various aberrations are well corrected in each focal length state from the wide-angle end state to the telephoto end state, and the excellent optical performance is exhibited.

Example 6

Figure 11:
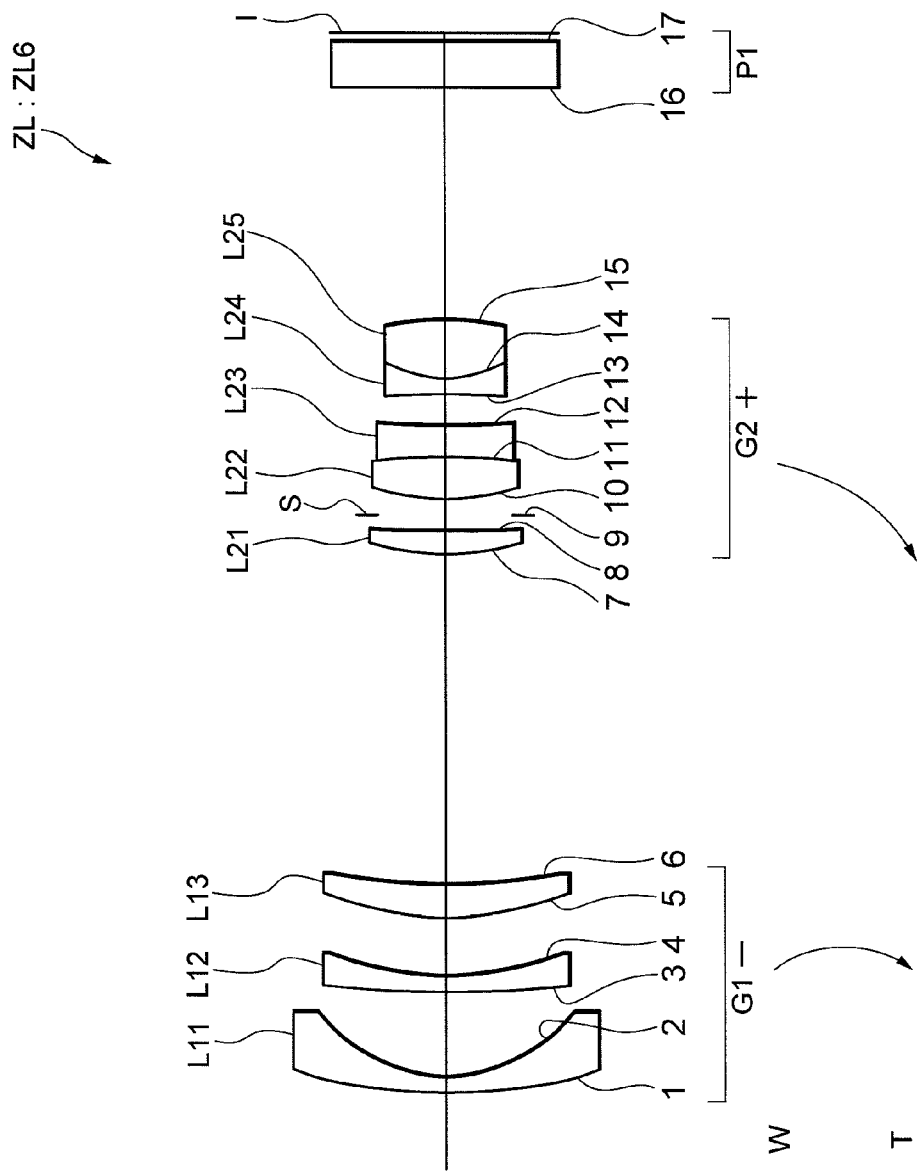
FIG. 11 is a sectional view showing a configuration of a zoom lens system according to Example 6.

FIG. 11 is a view showing a configuration of a zoom lens system ZL6 according to Example 6. The zoom lens system ZL6 in FIG. 11 is composed of, in order from an object side, a first lens group G1 having negative refractive power and a second lens group G2 having positive refractive power.

The first lens group G1 has negative refractive power on the whole and is composed of three lenses such as a negative meniscus lens L11 with a convex surface directed to the object side, a negative meniscus lens L12 with a convex surface directed to the object side and a positive meniscus lens L13 with a convex surface directed to the object side. The second lens group G2 has positive refractive power on the whole and is composed of five lenses such as a positive meniscus lens L21 with a convex surface directed to the object side, an aperture stop S, a cemented lens constructed by a double convex lens L22 cemented with a double concave lens L23, and a cemented lens constructed by a double concave lens L24 cemented with a double convex lens L25.

The following Table 6 shows values of the various items of data associated with Example 6. In Example 6, the second lens surface and the fifteenth lens surface are formed with an aspherical shape. (Aspherical Surface Data) shows values of the conical coefficient k and of respective aspherical surface coefficients A3 through A10. In Example 6, a distance d1 along the optical axis between the first lens group G1 and the second lens group G2, a distance d2 along the optical axis between the second lens group G2 and the low-pass filter P1 and the total lens length t1, vary upon zooming. (Variable Distances Data) shows the variable distances at the respective focal lengths in the wide-angle end state, the intermediate focal length state and the telephoto end state.

TABLE 6

(Specifications)

| | W | M | T |
|---|---|---|---|
| f = | 10.25 | 17.30 | 29.30 |
| Bf = | 0.5 | 0.5 | 0.5 |
| FNO = | 3.45 | 4.43 | 6.12 |
| 2ω = | 71.0° | 44.1° | 26.8° |

(Lens Data)

| i | r | d | νd | nd |
|---|---|---|---|---|
| 1 | 33.9338 | 1.0000 | 40.4 | 1.80610 |
| *2 | 9.3127 | 5.5000 | | |
| 3 | 68.3135 | 1.0000 | 55.5 | 1.69680 |
| 4 | 19.4424 | 3.7692 | | |
| 5 | 20.5521 | 2.2000 | 23.8 | 1.84666 |
| 6 | 46.8811 | (d1) | | |
| 7 | 17.0367 | 1.5500 | 46.6 | 1.81600 |
| 8 | 156.4657 | 1.0000 | | |
| 9 | 0.0000 | 1.0000 | | Aperture Stop |
| 10 | 14.9457 | 2.7457 | 52.3 | 1.75500 |
| 11 | −38.7806 | 2.0000 | 25.5 | 2.00069 |
| 12 | 74.0649 | 2.0000 | | |
| 13 | −100.0000 | 1.0000 | 40.8 | 1.88300 |
| 14 | 7.7525 | 3.8000 | 81.5 | 1.49700 |
| *15 | −19.9443 | (d2) | | |
| 16 | 0.0000 | 3.0000 | 64.2 | 1.51680 |
| 17 | 0.0000 | (Bf) | | |

(Aspherical Surface Data)

Surface Number: 2

κ = 0.2205
A3 = 0.00000E+00
A4 = 4.05450E−05
A6 = 1.20060E−06
A8 = −1.44530E−08
A10 = 1.11260E−10

Surface Number: 15

κ = 2.5520
A3 = 0.00000E+00
A4 = 1.73840E−04
A6 = 3.58550E−06
A8 = −7.32020E−08
A10 = 1.05820E−10

(Variable Distances Data)

| | W | M | T |
|---|---|---|---|
| f = | 10.25 | 17.30 | 29.30 |
| d1 = | 21.28331 | 8.56838 | 0.99723 |
| d2 = | 14.88615 | 22.33322 | 35.00908 |
| tl = | 68.23430 | 62.96644 | 68.07114 |

(Values for Conditional Expressions)

(1) dn/ds = 0.173
(2) dn/da = 0.421
(3) dn/s2 = 0.135
(4) sp/dn = 0.500
(5) sp/f2 = 0.054
(6) sp/dp = 0.263
(7) sp/Ra = 0.014
(8) (Rb − Ra)/(Rb + Ra) = 6.712
(9) nd = 2.0007
(10) ndn − ndp = 0.316
(11) νdp − νdn = 33.82

Figure 12A:
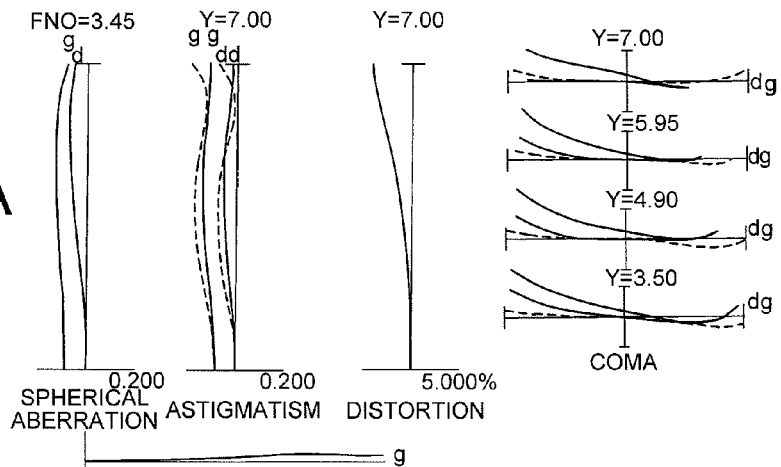
Figure 12B:
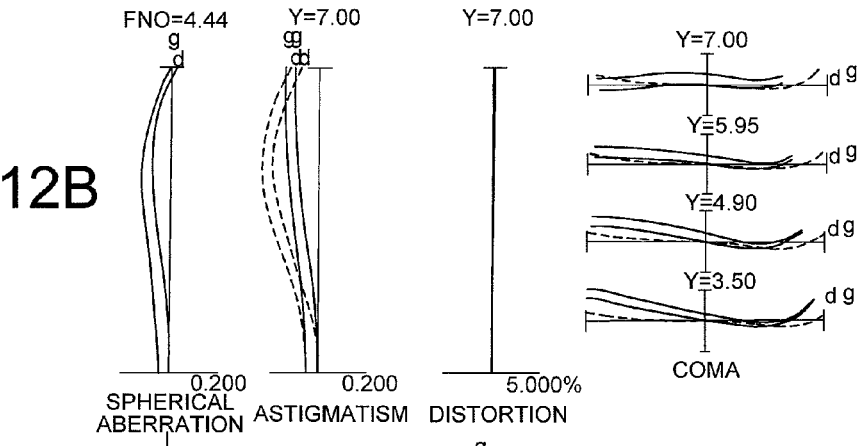
Figure 12C:
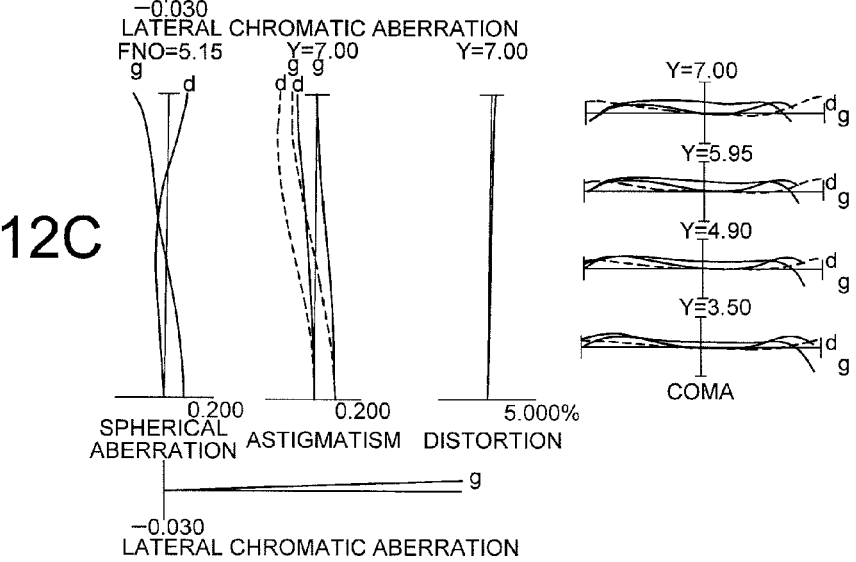

FIGS. 12A, 12B and 12C are diagrams of various aberrations in an infinite-distance focusing state in Example 6, in which FIG. 12A is diagrams of various aberrations in the wide-angle end state, FIG. 12B is diagrams of various aberrations in the intermediate focal length state, and FIG. 12C is diagrams of various aberrations in the telephoto end state. As obvious from these aberration diagrams according to Example 6, it is understood that the various aberrations are well corrected in each focal length state from the wide-angle end state to the telephoto end state and excellent optical performance is exhibited.

What is claimed is:

1. A zoom lens system comprising, in order from an object side:
a first lens group having negative refractive power; and
a second lens group having positive refractive power,
wherein said second lens group has two cemented lenses, and a distance between said first lens group and said second lens group varies upon zooming from a wide-angle end state to a telephoto end state, and the following conditional expression is satisfied:

$0.229 \leq dn/ds < 0.5$ where ds denotes a thickness along an optical axis of the two cemented lenses of the second lens group from a surface closest to the object to a surface closest to the image, and dn denotes a thickness along the optical axis of a negative lens of the cemented lens disposed on the object side in the two cemented lenses.

2. The zoom lens system according to claim 1, wherein said zoom lens system satisfies the following conditional expression:

$0.4 < dn/da < 1.0$ where da denotes a thickness along an optical axis of the cemented lens disposed on the object side in the two cemented lenses.

3. The zoom lens system according to claim 1, wherein said zoom lens system satisfies the following conditional expression:

$0.02 < dn/s2 < 0.50$ where s2 denotes a combined thickness along the optical axis of the second lens group.

4. The zoom lens system according to claim 1, wherein said zoom lens system satisfies the following conditional expression:

$0.05 < sp/dn < 1.00$ where sp denotes a distance between the two cemented lenses.

5. The zoom lens system according to claim 1, wherein said zoom lens system satisfies the following conditional expression:

$0.03 < sp/f2 < 0.20$ where sp denotes a distance between the two cemented lenses, and f2 denotes a focal length of the second lens group.

6. The zoom lens system according to claim 1, wherein said zoom lens system satisfies the following conditional expression:

$0.05 < sp/dp < 0.20$ where dp denotes a thickness along an optical axis of a positive lens of the cemented lens disposed on the image side in the two cemented lenses, and sp denotes a distance between the two cemented lenses.

7. The zoom lens system according to claim 1, wherein an image side surface of said negative lens of the cemented lens disposed on the object side in the two cemented lenses is a concave surface directed to the image side, and said zoom lens system satisfies the following conditional expression:

$0.01 < sp/Ra < 0.15$ where Ra denotes a radius of curvature of the image-side surface of the negative lens, and sp denotes the distance between the two cemented lenses.

8. The zoom lens system according to claim 1, wherein an image-side surface of the negative lens of the cemented lens disposed on the object side in the two cemented lenses is a concave surface directed to the image side, and said zoom lens system satisfies the following conditional expression:

$$-1.1 \leq (Rb-Ra)/(Rb+Ra) < 7.0$$

where Ra denotes a radius of curvature of the concave surface, and Rb denotes a radius of curvature of an object-side surface of the lens disposed on the image side of the negative lens.

9. The zoom lens system according to claim 1, wherein said first lens group includes, in order from the object side, one or two single lens(es) having negative refractive power and a single lens having positive refractive power.

10. The zoom lens system according to claim 1, wherein the negative lens is an image-side lens of the cemented lens disposed on the object side in the two cemented lenses and has a concave surface directed to the image side.

11. The zoom lens system according to claim 1, wherein said zoom lens system satisfies the following conditional expression:

$$1.77 < nd$$

where nd denotes a refractive index with respect to d-line of the negative lens, and the negative lens is an image-side lens of the cemented lens disposed on the object side in the two cemented lenses.

12. The zoom lens system according to claim 1, wherein said second lens group includes three lens components.

13. The zoom lens system according to claim 1, wherein said second lens group includes, in order from the object side, a positive single lens, a cemented lens constructed by a positive lens cemented with a negative lens, and a cemented lens constructed by a positive lens cemented with a negative lens.

14. The zoom lens system according to claim 1, wherein a surface closest to the image side of said cemented lens disposed on the image side in said two cemented lenses is formed with an aspherical shape.

15. The zoom lens system according to claim 1, wherein said zoom lens system satisfies the following conditional expression:

$$0.15 < ndn-ndp < 0.50$$

where ndp denotes an average of refractive indices of the positive lenses contained in the two cemented lenses, and ndn denotes an average of the refractive indices of the negative lenses contained in the two cemented lenses.

16. The zoom lens system according to claim 1, wherein said zoom lens system satisfies the following conditional expression:

$$20 < vdp-vdn < 55$$

where vdp denotes an average of Abbe numbers of the positive lenses contained in the two cemented lenses, and vdn denotes an average of Abbe numbers of the negative lenses contained in the two cemented lenses.

17. The zoom lens system according to claim 1, wherein at least a portion of said second lens group moves in a direction including a component perpendicular to an optical axis.

18. The zoom lens system according to claim 1, wherein at least one of said cemented lenses of said second lens group moves in a direction including a component perpendicular to the optical axis.

19. The zoom lens system according to claim 1, wherein said second lens group includes two cemented lenses disposed consecutively in alignment, and the surface closest to the image side of said consecutive cemented lenses is a convex surface directed to the image side.

20. The zoom lens system according to claim 1, wherein said second lens group includes at least two double convex lenses.

21. The zoom lens system according to claim 1, wherein a positive lens of said cemented lens disposed on the object side within said second lens group is a double convex lens.

22. A zoom lens system according to claim 1, wherein one of said cemented lenses included in said second lens group is a positive lens element.

23. An optical apparatus including said zoom lens system according to claim 1.

24. A method for manufacturing a zoom lens system including, in order from an object side, a first lens group and a second lens group, said method comprising steps of:
  disposing said first lens group so as to have negative refractive power, and disposing said second lens group including two cemented lenses so as to have positive refractive power on the whole,
  a distance between said first lens group and said second lens group varying upon zooming from a wide-angle end state to a telephoto end state; and
  satisfying the following conditional expression:

$$0.229 \leq dn/ds < 0.5$$

where ds denotes a thickness along an optical axis of the two cemented lenses of the second lens group from a surface closest to the object to a surface closest to the image, and dn denotes a thickness along the optical axis of a negative lens of the cemented lens disposed on the object side in the two cemented lenses.

25. The method of manufacturing a zoom lens system according to claim 24, further comprising a step of:
  disposing said second lens group so as to satisfy the following conditional expression:

$$0.4 < dn/da < 1.0$$

where da denotes a thickness along the optical axis of the cemented lens disposed on the object side in the two cemented lenses.

26. The method of manufacturing a zoom lens system according to claim 24, further comprising a step of:
  disposing said second lens group so as to satisfy the following conditional expression:

$$0.02 < dn/s2 < 0.50$$

where s2 denotes a combined thickness along the optical axis of the second lens group.

27. A zoom lens system comprising, in order from an object side:
  a first lens group having negative refractive power; and
  a second lens group having positive refractive power, wherein said second lens group has two cemented lenses, and a distance between said first lens group and said second lens group varies upon zooming from a wide-angle end state to a telephoto end state, and the following conditional expressions are satisfied:

$$0.1 < do/ds < 0.5$$

$$0.05 < sp/dn < 1.00$$

where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, and sp denotes a distance between the two cemented lenses.

28. A zoom lens system comprising, in order from an object side:
    a first lens group having negative refractive power; and
    a second lens group having positive refractive power, wherein said second lens group has two cemented lenses, and a distance between said first lens group and said second lens group varies upon zooming from a wide-angle end state to a telephoto end state, and the following conditional expressions are satisfied:

$0.1 < do/ds < 0.5$ $0.03 < sp/f2 < 0.20$ where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, sp denotes a distance between the two cemented lenses, and f2 denotes a focal length of the second lens group G2.

29. A zoom lens system comprising, in order from an object side:
    a first lens group having negative refractive power; and
    a second lens group having positive refractive power, wherein said second lens group has two cemented lenses, and a distance between said first lens group and said second lens group varies upon zooming from a wide-angle end state to a telephoto end state, and the following conditional expressions are satisfied:

$0.1 < do/ds < 0.5$ $0.05 < sp/dp < 0.20$ where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, dp denotes a thickness along the optical axis of a positive lens of the cemented lens disposed on the image side in the two cemented lenses, and sp denotes a distance between the two cemented lenses.

30. A method for manufacturing a zoom lens system including, in order from an object side, a first lens group and a second lens group, said method comprising steps of:
    disposing said first lens group so as to have negative refractive power, and disposing said second lens group including two cemented lenses so as to have positive refractive power on the whole,
    a distance between said first lens group and said second lens group varying upon zooming from a wide-angle end state to a telephoto end state; and
    satisfying the following conditional expressions:

$0.1 < do/ds < 0.5$ $0.05 < sp/dn < 1.00$ where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, and sp denotes a distance between the two cemented lenses.

31. A method for manufacturing a zoom lens system including, in order from an object side, a first lens group and a second lens group, said method comprising steps of:
    disposing said first lens group so as to have negative refractive power, and disposing said second lens group including two cemented lenses so as to have positive refractive power on the whole,
    a distance between said first lens group and said second lens group varying upon zooming from a wide-angle end state to a telephoto end state; and
    satisfying the following conditional expressions:

$0.1 < dn/ds < 0.5$ $0.03 < sp/f2 < 0.20$ where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, sp denotes a distance between the two cemented lenses, and f2 denotes a focal length of the second lens group G2.

32. A method for manufacturing a zoom lens system including, in order from an object side, a first lens group and a second lens group, said method comprising steps of:
    disposing said first lens group so as to have negative refractive power, and disposing said second lens group including two cemented lenses so as to have positive refractive power on the whole,
    a distance between said first lens group and said second lens group varying upon zooming from a wide-angle end state to a telephoto end state; and
    satisfying the following conditional expressions:

$0.1 < dn/ds < 0.5$ $0.05 < sp/dp < 0.20$ where ds denotes a thickness along an optical axis of the two cemented lenses of the second lens group from a surface closest to the object to a surface closest to the image, do denotes a thickness along the optical axis of a negative lens of the cemented lens disposed on the object side in the two cemented lenses, dp denotes a thickness along the optical axis of a positive lens of the cemented lens disposed on the image side in the two cemented lenses, and sp denotes a distance between the two cemented lenses.

* * * * *